United States Patent
Oh et al.

(10) Patent No.: US 11,297,640 B2
(45) Date of Patent: Apr. 5, 2022

(54) METHOD AND APPARATUS FOR TRANSMITTING/RECEIVING CONTROL INFORMATION IN WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Taehyoung Kim, Gyeonggi-do (KR); Hyunseok Ryu, Gyeonggi-do (KR); Sungjin Park, Gyeonggi-do (KR); Jonghyun Bang, Gyeonggi-do (KR); Jeongho Yeo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 133 days.

(21) Appl. No.: 16/579,201

(22) Filed: Sep. 23, 2019

(65) Prior Publication Data

US 2020/0100276 A1 Mar. 26, 2020

(30) Foreign Application Priority Data

Sep. 21, 2018 (KR) .................. 10-2018-0114172
Mar. 28, 2019 (KR) .................. 10-2019-0035845

(51) Int. Cl.
*H04W 72/12* (2009.01)
*H04W 16/14* (2009.01)
*H04L 5/00* (2006.01)

(52) U.S. Cl.
CPC ....... *H04W 72/1289* (2013.01); *H04L 5/0007* (2013.01); *H04L 5/0055* (2013.01); *H04W 16/14* (2013.01); *H04W 72/1273* (2013.01)

(58) Field of Classification Search
CPC ......... H04W 74/0808; H04W 74/0816; H04W 74/002; H04W 72/0446; H04W 72/0406;
(Continued)

(56) References Cited

U.S. PATENT DOCUMENTS

2018/0109360 A1   4/2018   Sun et al.
2019/0150196 A1*  5/2019   Koorapaty ............ H04L 1/1812
                                                              370/329
(Continued)

FOREIGN PATENT DOCUMENTS

WO   WO 2017/099835   6/2017
WO   WO 2019031830    2/2019
WO   WO 2020/033623   2/2020

OTHER PUBLICATIONS

Huawei et al., "HARQ Enhancements in NR Unlicensed", R1-1808063, 3GPP TSG RAN WG1 Meeting #94, Aug. 20-24, 2018, 8 pages.
(Continued)

*Primary Examiner* — Elton Williams
(74) *Attorney, Agent, or Firm* — The Farrell Law Firm, P.C.

(57) ABSTRACT

The disclosure relates to a communication method and system for converging a 5$^{th}$-Generation (5G) communication system for supporting higher data rates beyond a 4$^{th}$-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure relates to a method and an apparatus for transmitting/receiving a feedback by a receiving end in a wireless communication system.

12 Claims, 13 Drawing Sheets

(58) Field of Classification Search
CPC ......... H04W 72/1289; H04W 72/1273; H04W 16/14; H04L 5/0055; H04L 1/1864; H04L 5/0007
See application file for complete search history.

(56) References Cited

U.S. PATENT DOCUMENTS

2020/0053728 A1* 2/2020 Huang ................ H04L 27/2601
2021/0204280 A1* 7/2021 Wang .................... H04L 1/1812

OTHER PUBLICATIONS

Interdigital Inc., "On HARQ Enhancements for NR-U", R1-1809091, 3GPP TSG RAN WG1 Meeting #94, Aug. 20-24, 2018, 6 pages.
Huawei et al., "NR Frame Structure and Scheduling on Unlicensed Bands", R1-1803678, 3GPP TSG RAN WG1 Meeting #92bis, Apr. 16-20, 2018, 8 pages.
International Search Report dated Jan. 2, 2020 issued in counterpart application No. PCT/KR2019/012298, 8 pages.
Qualcomm Incorporated, "Enhancements to Scheduling and HARQ Operation for NR-U", R1-1809481, 3GPP TSG RAN WG1 Meeting #94, Aug. 20-24, 2018, 7 pages.
Samsung, "HARQ Enhancements for NR-U", R1-1901033, 3GPP TSG RAN WG1 Ad-Hoc Meeting 1901, Jan. 21-25, 2019, 10 pages.
European Search Report dated Jun. 14, 2021 issued in counterpart application No. 19863438.8-1205, 13 pages.

* cited by examiner

METHOD AND APPARATUS FOR TRANSMITTING/RECEIVING CONTROL INFORMATION IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2018-0114172 and 10-2019-0035845, filed on Sep. 21, 2018, and Mar. 28, 2019, respectively, in the Korean Intellectual Property Office, the entire disclosure of each of which is incorporated herein by reference.

BACKGROUND

1. Field

The disclosure relates generally to a method and an apparatus for transmitting/receiving control information, such as a hybrid automatic repeat request (HARQ)-acknowledgement (ACK) feedback, in a wireless communication system.

2. Description of Related Art

To meet the increasing demand for wireless data traffic since deployment of $4^{th}$ generation (4G) communication systems, efforts have been made to develop an improved 5th generation (5G) or pre-5G communication system, which may also be referred to as a "beyond 4G network" or a "post long term evolution (LTE) system".

A 5G communication system is intended to be implemented in higher frequency (mmWave) bands, e.g., 60 GHz bands, to provide higher data rates. To decrease propagation loss of radio waves and increase transmission distance, beamforming, massive multiple-input multiple-output (MIMO), full dimensional MIMO (FD-MIMO), array antennas, analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, etc. Additionally, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) have been developed as advanced access technologies.

The Internet is now evolving to the Internet of things (IoT) where distributed entities, i.e., things, exchange and process information without human intervention. The Internet of everything (IoE), which is a combination of the IoT technology and the big data processing technology through connection with a cloud server, has also emerged. As technology elements, such as sensing technology, wired/wireless communication and network infrastructure, service interface technology, and security technology have been demanded for IoT implementation, a sensor network, machine-to-machine (M2M) communication, machine type communication (MTC), etc., have been recently researched. Such an IoT environment may provide intelligent Internet technology services that create a new value by collecting and analyzing data generated among connected things. IoT may be applied to a variety of fields including smart home, smart building, smart city, smart car or connected cars, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described big data processing technology may also be considered to be as an example of a convergence between the 5G technology and the IoT technology.

It has become possible to provide various services as a result of the above description and development of wireless communication systems, and a scheme for efficiently providing such services is therefore required.

SUMMARY

The disclosure is provided to address at least the problems and/or disadvantages described above and to provide at least the advantages described below.

Accordingly, an aspect of the disclosure is to provide an apparatus and a method that effectively provide a service in a wireless communication system.

Another aspect of the disclosure is to provide a method and an apparatus for improving a signal transmitting/receiving process in a communication system using an unlicensed band.

In accordance with an aspect of the disclosure, a method is provided for a terminal, which includes receiving, from a base station, information indicating a time to transmit an uplink signal including a response to downlink data; receiving the downlink data from the base station; determining, based on the information, a slot to transmit a result of receiving the downlink data; and transmitting a message including the result of receiving the downlink data to the base station in the determined slot.

In accordance with another aspect of the disclosure, a terminal is provided, which includes a transceiver; and a controller configured to receive, from a base station, through the transceiver, information indicating a time to transmit an uplink signal, the uplink signal including a response to downlink data, receive the downlink data from the base station, through the transceiver, determine, based on the information, a slot to transmit a result of receiving the downlink data, and transmit, through the transceiver, a message including the result of receiving the downlink data to the base station in the determined slot.

In accordance with another aspect of the disclosure, a method is provided for a base station, which includes transmitting, to a terminal, information indicating a time to transmit an uplink signal, the uplink signal including a response to downlink data; transmitting the downlink data to the terminal; and receiving, from the terminal, in a slot determined based on the information, a message including a result of receiving the downlink data.

In accordance with another aspect of the disclosure, a base station is provided, which includes a transceiver; and a controller configured to transmit, to a terminal, through the transceiver, information indicating a time to transmit an uplink signal, the uplink signal including a response to downlink data, transmit, through the transceiver, the downlink data to the terminal, and receive, from the terminal, in a slot determined based on the information, a message including a result of receiving the downlink data.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
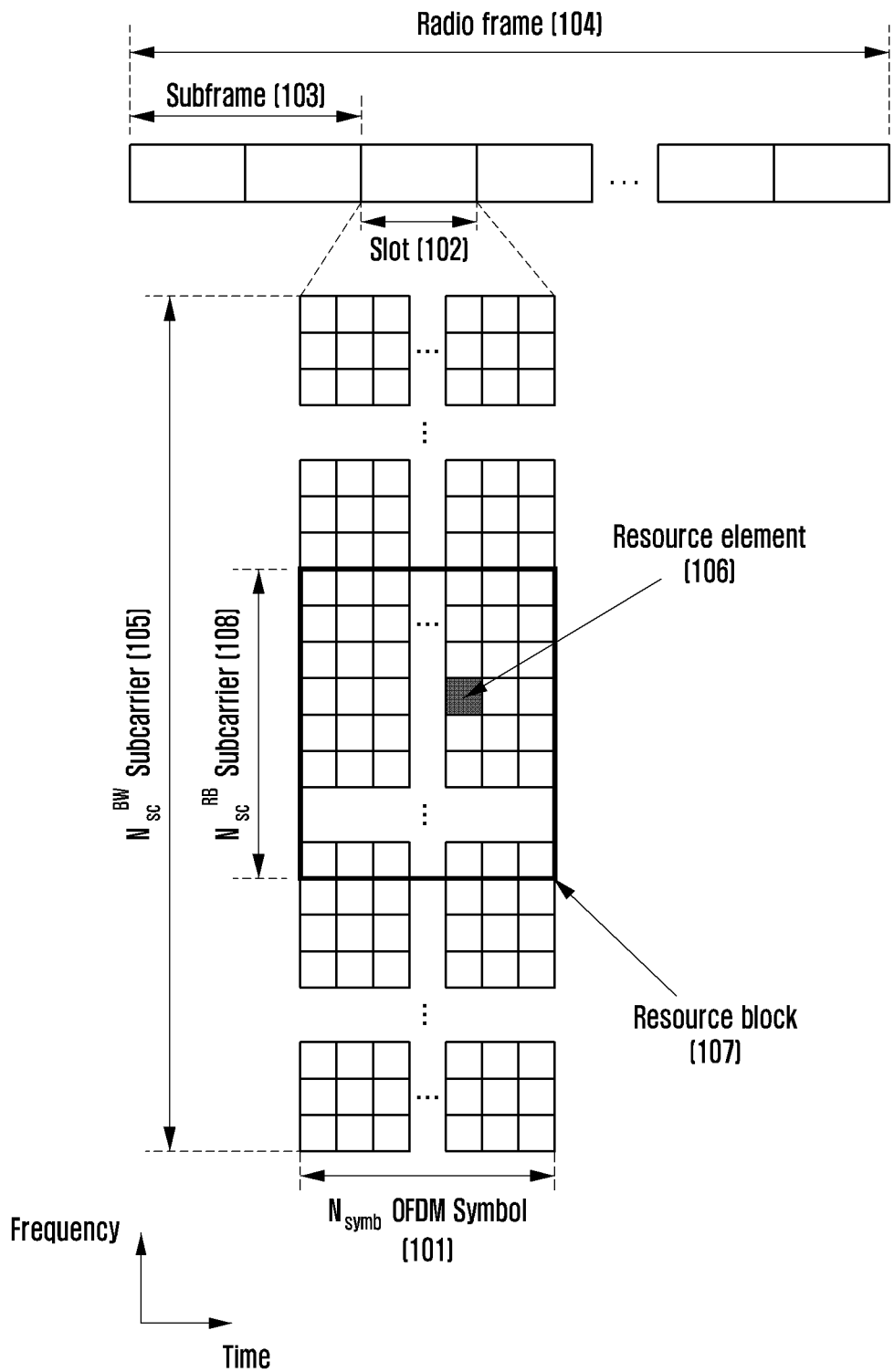
FIG. 1 illustrates a transmission structure of an up/downlink time-frequency domain in a new radio (NR) system according to an embodiment.

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms as described below are defined in consideration of the functions in the embodiments, and the meaning of the terms may vary according to the intention of a user or operator, convention, etc. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In describing the embodiments, descriptions of technologies which are already known to those skilled in the art and are not directly related to the disclosure may be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements may be provided with identical reference numerals.

Herein, each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create devices for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). Alternatively, the functions noted in the blocks may occur out of the order. For example, two blocks shown in succession may in fact be executed substantially concurrently or the blocks may sometimes be executed in the reverse order, depending upon the functionality involved.

Herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" may include software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by a "unit" may be either combined into a smaller number of elements, or divided into a larger number of elements. Moreover, the elements and units may be implemented to reproduce one or more CPUs within a device or a security multimedia card. Also, a "unit" may include one or more processors.

Compared with existing 4G systems, support for more diversified services is considered in 5G systems. For example, most representative services in 5G systems may include enhanced mobile broad band (eMBB), ultra-reliable and low-latency communication (URLLC), massive MTC (mMTC), evolved multimedia broadcast/multicast service (eMBMS), etc. However, the above examples are not limiting in any manner.

A system providing the URLLC service may be referred to as a URLLC system, and a system providing the eMBB service may be referred to as an eMBB systems. In addition, the terms "service" and "system" may be used interchangeably.

Multiple services may be provided to a user in a communication system and, in order to provide multiple services to a user, there is a need for a method capable of providing respective services within the same time interval according to the characteristics, and an apparatus using the same.

In a wireless communication system such as an LTE or LTE advanced (LTE-A) system or a 5G NR system, a configuration may be made to transmit downlink control information (DCI) including resource assignment information or the like, by which a downlink signal is transmitted from a base station to a terminal through a physical downlink control channel (PDCCH), such that the terminal receives at least one downlink signal of DCI (e.g., channel-state information reference signal (CSI-RS)), a physical broadcast channel (PBCH), or a physical downlink shared channel (PDSCH).

For example, the base station transmits DCI to the terminal by using subframe n so as to instruct the terminal to receive the PDSCH through the PDCCH by using subframe n. After receiving the DCI, the terminal receives the PDSCH by using subframe n according to the received DCI.

In addition, in an LTE, LTE-A, or NR system, a base station may be configured to transmit DCI including uplink resource assignment information to a terminal through a PDCCH such that the terminal transmits, to the base station, at least one uplink signal of uplink control information (e.g., a sounding reference signal (SRS), uplink control information (UCI), or a physical random access channel (PRACH)) or uplink data channel (physical uplink shared channel (PUSCH)).

For example, if the terminal receives, by using subframe n, uplink transmission configuration information (or uplink DCI or a UL grant) transmitted from the base station through the PDCCH, the terminal may perform PUSCH transmission according to a time defined in advance (e.g., n+4), a time configured based on an upper-level signal (e.g., n+k), or uplink signal transmission time indicator information (e.g., n+k) included in uplink transmission configuration information.

If a configured downlink transmission is performed through an unlicensed band from the base station to the terminal, or if a configured uplink transmission is performed through the unlicensed band from the terminal to the base station, the transmitting device (the base station or the terminal) may perform a channel access procedure or listen-before talk (LBT) with regard to an unlicensed band through which signal transmission is configured, before or immediately before the timepoint at which the configured signal transmission starts. As a result of performing the channel access procedure, if it is determined that the unlicensed band is in an idle state, the transmitting device may access the unlicensed band and perform the configured signal transmission.

However, if it is determined, as a result of the channel access procedure performed by the transmitting device, that the unlicensed band is not in an idle state, or if a busy state is confirmed, the transmitting device may fail to perform the configured signal transmission because the same cannot access the unlicensed band.

In a channel access procedure in connection with an unlicensed band having a signal transmission configured therefor, the transmitting device normally receives signals through the unlicensed band for a predetermined time or for a time calculated according to a predefined rule (e.g., a time calculated at least based on at least one random value selected by the base station or the terminal). Thereafter, the transmitting device may determine whether or not the unlicensed band is in an idle state by comparing the intensity of received signals with a threshold value defined in advance or calculated by a function including at least one parameter of a channel bandwidth or a signal bandwidth through which a signal to be transmitted is transmitted, intensity of transmission power, or the beam width of transmitted signals.

For example, if the intensity of signals received by the transmitting device for 25 us is lower than the predefined threshold value of −72 dBm, the transmitting device may determine that the unlicensed band is in an idle state and may perform the configured signal transmission. The maximum time of possible signal transmission may be limited according to the maximum channel occupancy time (MCOT) defined for each nation/region through the unlicensed band, or according to the type of the transmitting device (e.g., a base station, a terminal, a master device, or a slave device).

For example, in Japan, a base station or a terminal may perform a channel access procedure through an unlicensed band of 5 GHz and then occupy the channel for a maximum time of 4 ms without performing an additional channel access procedure, thereby transmitting signals. If the intensity of signals received for 25 us is higher than the predefined threshold value of −72 dBm, the base station determines that the unlicensed band is not in an idle state, and transmits no signals.

In a 5G communication system, various technologies will be introduced, such as a technology for code block group-based retransmission and a technology capable of transmitting an uplink signal without uplink scheduling information, in order to provide various services and to support high data transmission rates. Therefore, when the 5G communication is to be performed through an unlicensed band, a more efficient channel access procedure is needed in view of various parameters.

Wireless communication systems have moved away from the initial systems, which mainly provided voice-based services, and have developed toward broadband wireless communication systems that provide high-speed and high-quality packet data services, such as communication standards including high speed packet access (HSPA) of $3^{rd}$ generation partnership project (3GPP), LTE or evolved universal terrestrial radio access (E-UTRA), LTE-A, high rate packet data (HRPD) of 3GPP2, ultra mobile broadband (UMB), and 802.16e of the Institute of Electrical and Electronics Engineers (IEEE). In addition, communication standards of 5G or NR are being developed for 5G wireless communication systems.

In such a wireless communication system, including 5G, a terminal may be provided with at least one service of eMBB, mMTC, and URLLC, as described above. The above-mentioned services may be provided to the same terminal for the same time interval. For example, eMBB may be a service for transmitting a large amount of data at a high rate, mMTC may be a service for minimizing terminal power and enabling multiple terminals to access, and URLLC may be a service for high reliability and low latency. The three services may constitute a scenario in an LTE system or a post-LTE 5G/new radio or NR system, but this example is not limiting in any manner.

Herein, a base station refers to an entity that assigns resources to terminals, and may include an eNode B, a Node B, a wireless access unit, a base station controller, or a node on a network. A terminal may include a user equipment (UE), a mobile station (MS), a cellular phone, a smartphone, a computer, or a multimedia system capable of performing a communication function. A downlink (DL) refers to a wireless transmission path of signals transmitted from a base station to a terminal, and an uplink (UL) refers to a wireless transmission path of signals transmitted from the terminal to the base station.

In addition, embodiments will be described with reference to an LTE or LTE-A system as an example, and terms "physical channel" and "signal" in a conventional LTE or LTE-A system may be used to describe a method and an apparatus provided by the disclosure. Embodiments may also be applied to other communication systems having similar technical backgrounds or channel types as that of the mobile communication system described in the disclosure. For example, 5G mobile communication technologies (5G and NR) developed after LTE-A may be included therein. Moreover, embodiments may also be applied to other communication systems through partial modification without substantially deviating from the scope of the disclosure as deemed by a person skilled in the art.

An NR system, which is a typical example of a wideband wireless communication system, employs an orthogonal frequency division multiplexing (OFDM) scheme for the DL and employs both OFDM and single carrier frequency division multiple access (SC-FDMA) for the UL. A multiple access scheme normally assigns and manages time-frequency resources, which are used to load and send data or control information for each user, such that the same do not overlap each other, i.e., orthogonality is ensured, thereby distinguishing data or control information for each user.

The NR system adopts a HARQ scheme such that, if decoding failure occurs during the initial transmission, the corresponding data is retransmitted in the physical layer. According to the HARQ scheme, if the receiver fails to accurately decode data, the receiver transmits information indicating the decoding failure (negative acknowledgement (NACK)) to the transmitter such that the transmitter can retransmit the corresponding data in the physical layer. The receiver combines the data retransmitted by the transmitter with data, decoding of which has failed previously, thereby improving the data receiving performance. In addition, if the receiver accurately decodes data, the receiver may transmit information indicating successful decoding (ACK) to the transmitter such that the transmitter can transmit new data.

Hereinafter, a procedure and a method for accessing a channel in connection with an unlicensed band and a method and an apparatus for transmitting/receiving signals through the unlicensed band according to the disclosure will be described. More specifically, a method for performing a frame-based channel access procedure and a method for transmitting/receiving signals through an unlicensed band accessed through the frame-based channel access procedure in a wireless communication system, particularly in a system including a node that receives a downlink signal through an unlicensed band or a node that wants to transmit an uplink signal through an unlicensed band, will be described. The disclosure provides a method wherein, if a node that transmits a downlink signal through an unlicensed band or a node that wants to transmit an uplink signal through the unlicensed band has performed a frame-based channel access procedure, the channel occupancy time of the transmitting device and the slot structure for the channel occupancy time are transmitted by using a slot format indicator or the like, and the node, after receiving the same, determines the channel occupancy time and the slot structure and then transmits an uplink signal.

FIG. 1 illustrates a transmission structure of an up/downlink time-frequency domain in a new radio (NR) system according to an embodiment. Specifically, FIG. 1 illustrates a transmission structure of a time-frequency domain, which is a radio resource domain in an NR system.

Referring to FIG. 1, the horizontal axis in the radio resource domain denotes a time domain, and the vertical axis refers to a frequency domain. The smallest transmission unit in the time domain may be an OFDM or discrete Fourier transform-spread-OFDM (DFT_f-OFDM) symbol, and a group of $N_{symb}$ OFDM or DFT-s-OFDM symbols 101 may constitute one slot 102. The symbols may be OFDM symbols when signals are transmitted/received by using an OFDM multiplexing scheme, and DFT-s-OFDM symbols when signals are transmitted/received by using a DFT-s-OFDM or SC-FDMA multiplexing scheme. Herein, OFDM symbols and DFT-s-OFDM symbols will be indiscriminately referred to as OFDM symbols for convenience of description, and the description will be made in connection with downlink signal transmission/reception, but the same is applicable to uplink signal transmission/reception.

If the subcarrier spacing (SCS) is 15 kHz, one slot 102 constitutes one subframe 103, and the length of each of the slot 102 and the subframe 103 may be 1 ms. The number of slots 102 constituting one subframe 103 and the length of the slots may differ depending on the SCS. For example, if the SCS is 30 kHz, a group of four slots 102 may constitute one subframe 103. In this case, the length of the slots 102 is 0.5 ms, and the length of the subframe 103 is 1 ms. The radio frame 104 may be a time-domain interval including ten subframes. The smallest transmission unit in the frequency domain is a subcarrier, and the bandwidth of the entire system transmission band (transmission bandwidth) includes a total of $N_{SC}^{BW}$ subcarriers 105.

However, specific numerical values, such as the SCS, the number of slots 102 included in the subframe 103, the length of the slots 102, and the length of the subframe 103, may be applied variably. For example, in an LTE system, the SCS may be 15 kHz, but a group of two slots constitutes one subframe 103, the length of the slots 102 is 0.5 ms, and the length of the subframe 103 is 1 ms.

A basic unit of resources in the time-frequency domain is a resource element (RE) 106, which may be expressed in terms of an OFDM symbol index and a subcarrier index. A resource block (RB) or a physical resource block (PRB) 107 may be defined as $N_{symb}$ continuous OFDM symbols 101 in the time domain and $N_{SC}^{RB}$ continuous subcarriers 108 in the frequency domain. Accordingly, one RB 107 in one slot may include $N_{symb} \times N_{SC}^{RB}$ REs. In general, the smallest data assignment unit in the frequency domain is the RB 107. In an NR system, $N_{symb}=14$ and $N_{SC}^{RB}=12$ may be the normal case, and the number of RBs $N_{RB}$ may vary depending on the bandwidth of the system transmission band. In an LTE system, $N_{symb}=7$ and $N_{SC}^{RB}=12$ may be the normal case, and $N_{RB}$ may vary depending on the bandwidth of the system transmission band.

DCI may be transmitted within the initial N OFDM symbols inside a subframe. In general, N={1, 2, 3}. The terminal may receive a configuration of the number of symbols that may be used to transmit DCI, based on an upper-level signal from the base station. In addition, the base station may change, with regard to each slot, the number of symbols that may be used to transmit DCI inside a slot, according to the amount of control information to be transmitted through the current slot, and may deliver information regarding the number of symbols to the terminal through a separate downlink control channel.

In an NR or LTE system, scheduling information regarding downlink data or uplink data may be delivered from the base station to the terminal through DCI. The DCI may be defined in various formats, and may indicate, according to each format, whether the same corresponds to scheduling information regarding uplink data (a UL grant) or scheduling information regarding downlink data (a DL grant), whether the same corresponds to compact DCI having small-sized control information, whether or not the control information is fallback DCI, whether or not spatial multiplexing that uses a multi-antenna is applied, or whether or not the same corresponds to DCI for power control. For example, a DCI format (e.g., DCI format 1_0 of NR), which is scheduling information regarding downlink data (a DL grant), may include at least one of the following pieces of control information:

DCI format identifier: an identifier for identifying a format of received DCI.
Frequency-domain resource assignment: an indicator of an RB assigned for data transmission.
Time-domain resource assignment: an indicator of slots and symbols assigned for data transmission.
Virtual resource block (VRB)-to-PRB mapping: an indicator of whether or not a VRB mapping scheme is applied.
Modulation and coding scheme (MCS); an indicator of the modulation scheme used for data transmission and the size of a transport block which is data to be transmitted.
New data indicator: an indicator of whether HARQ initial transmission or retransmission is performed.
Redundancy version: an indicator of a redundancy version of the HARQ.
HARQ process number: an indicator of a process number of the HARQ.
PDSCH assignment index: an indicator of a number of PDSCH receiving results (e.g., a number of HARQ-ACKs) that the terminal must report to the base station.
Transmit power control (TPC) command for physical uplink control channel (PUCCH): an indicator of a transmit power control command regarding a PUCCH, which is an uplink control channel.
PUCCH resource indicator: an indicator of a PUCCH resource used to report a HARQ-ACK including the result of receiving a PDSCH configured based on the corresponding DCI.
PDSCH-to-HARQ_feedback timing indicator: an indicator of information regarding slots or symbols to transmit a PUCCH for reporting a HARQ-ACK including the result of receiving a PDSCH configured based on the corresponding DCI.

The DCI may undergo a channel coding and modulation processes and may be transmitted through a PDCCH (or control information) (hereinafter, used interchangeably) or an enhanced PDCCH (EPDCCH) (or enhanced control information) (hereinafter, used interchangeably).

Hereinafter, the description that a PDCCH or an EPDCCH has been transmitted/received may be understood as DCI transmission/reception through the PDCCH or EPDCCH, and PDSCH transmission/reception may be understood as downlink data transmission/reception through the PDSCH.

In general, the DCI may be scrambled as a specific radio network temporary identifier (RNTI) (or terminal identifier C-RNTI) independently of each terminal, and a cyclic redundancy check (CRC) may be added thereto. Then, the DCI may be channel-coded and configured as an independent PDCCH, which is then transmitted. In the time domain, the PDCCH is mapped and transmitted for the control channel transmission interval. The frequency domain mapping position of the PDCCH may be determined by the ID of each terminal, and the same may be transmitted while being distributed over the entire system transmission band.

Downlink data may be transmitted through a PDSCH, which is a physical channel for downlink data transmission. The PDSCH may be transmitted after the control channel transmission interval, and scheduling information, such as the specific mapping position in the frequency domain and the modulation scheme, is determined based on the DCI transmitted through the PDCCH.

By using the MCS among control information constituting the DCI, the base station notifies of the modulation scheme applied to the PDSCH to be transmitted to the terminal and the size of data to be transmitted (transport block size (TBS)). The MCS may include five bits, more than five bits, or less than five bits. The TBS corresponds to a size before channel coding for error correction is applied to the data (transport block (TB)) to be transmitted by the base station.

Modulation schemes supported by the NR system include quadrature phase shift keying (QPSK), 16QAM, 64QAM, and 256QAM, which have modulation orders ($Q_m$) of 2, 4, and 6, respectively. That is, for QPSK modulation, two bits can be transmitted per symbol; for 16QAM modulation, four bits can be transmitted per symbol; for 64QAM modulation, six bits can be transmitted per symbol; and for 256QAM modulation, eight bits can be transmitted per symbol. It is also possible to use a modulation scheme greater than 256QAM according to a system modification.

The NR system adopts, in connection with the up/downlink HARQ, an asynchronous HARQ scheme in which the data retransmission timepoint is not fixed. For example, in connection with the downlink, if the base station receives a HARQ NACK as a feedback regarding initially transmitted data from the terminal, the base station may freely determine the timepoint to transmit retransmission data through a scheduling operation. The terminal may buffer data determined to be erroneous as a result of decoding received data for the HARQ operation, and may combine the same with data retransmitted from the base station. HARQ ACK/NACK information of the PDSCH transmitted through subframe n-k may be transmitted from the terminal to the base station through the PUCCH or PUSCH in subframe n.

In a 5G communication system, such as NR, the value of k may be transmitted while being included in DCI that instructs or schedules reception of a PDSCH transmitted through subframe n-k, or the value of k may be configured for the terminal through an upper-level signal. The base station may configure one or more values of k based on an upper-level signal, and may also indicate a specific value of k through DCI. k may be determined according to the HARQ-ACK processing ability of the terminal, i.e., the minimum time necessary for the terminal to receive a PDSCH, to generate an HARQ-ACK regarding the PDSCH, and to report the same. In addition, the terminal may use a predefined value or a default value until the value ofk is configured.

Although an NR system has been given as an example to describe a wireless communication system and to describe a method and an apparatus provided by an embodiment, the disclosure is not limited to the NR system, and is applicable to various wireless communication systems such as LTE, LTE-A, LETE-A-Pro, and 5G. In addition, although a system and a device for transmitting/receiving signals by using an unlicensed band will be described in the disclosure, the disclosure is also applicable to systems operating in licensed bands.

In the following disclosure, upper-level signaling or an upper-level signal may refer to a signal delivery method for delivering a signal from a base station to a terminal through a downlink data channel in a physical layer, or from the terminal to the base station through an uplink data channel in the physical layer, and includes a signal delivery method through radio resource control (RRC) signaling, packet data convergence protocol (PDCP) signaling, or medium access control (MAC) control element (MAC CE). In addition, the upper-level signaling or upper-level signal may include system information commonly transmitted to multiple terminals, such as a system information block (SIB).

As described above, in a system that performs communication through an unlicensed band, a transmitting device (the base station or the terminal) that wants to transmit signals through the unlicensed band performs a channel access procedure or LBT with regard to the unlicensed band through which communication is to be performed, prior to transmitting signals, and may access the unlicensed band and perform signal transmission if it is determined according to the channel access procedure that the unlicensed band is in an idle state. If it is determined according to the performed channel access procedure that the unlicensed band is not in an idle state, the transmitting device cannot perform signal transmission.

The channel access procedure in connection with the unlicensed band may be largely divided into two according to whether the channel access procedure initiation timepoint of the transmitting device is fixed (frame-based equipment (FBE)) or variable (load-based equipment (LBE)). Besides the channel access procedure initiation timepoint, it is also possible to determine whether the transmitting device is an FBE device or an LBE device according to whether the transmit/receive structure of the transmitting device has one period or has no period. The description that the channel access procedure initiation timepoint is fixed indicates that the channel access procedure of the transmitting device may be initiated periodically according to a predefined period or according to a period declared or configured by the transmitting device. This may also indicate, in another sense, that the transmitting or receiving structure of the transmitting device has one period. The description that the channel access procedure initiation timepoint is variable indicates that the channel access procedure initiation timepoint of the transmitting device may be initiated any time when the transmitting device wants to transmit a signal through the unlicensed band. This may also indicate, in another sense, that the transmitting or receiving structure of the transmitting device does not have one period and is configured as needed.

Hereinafter, a channel access procedure when the channel access procedure initiation timepoint of the transmitting device is variable (load-based equipment) (hereinafter, referred to as a traffic-based channel access procedure or a channel access procedure) will be described.

In a channel access procedure in connection with an unlicensed band, the transmitting device measures the intensity of signals received through the unlicensed band for a fixed time or for a time calculated according to a predefined rule (e.g., a time calculated based on at least one random value selected by the base station or the terminal). Thereafter, the transmitting device may determine whether or not the unlicensed band is in an idle state by comparing the intensity of the received signals with a threshold value defined in advance or calculated by a function that determines the intensity of the received signals, which includes at least one parameter of the channel bandwidth, the signal bandwidth through which signals to be transmitted are transmitted, or the intensity of transmission power.

For example, the transmitting device may measure the intensity of signals for X us (e.g., 25 us) immediately before the time to transmit a signal and, if the measured intensity of received signals is lower than a threshold value T (e.g., −72 dBm) defined or calculated in advance, the transmitting device may determine that the unlicensed band is in an idle state and may transmit the configured signal. The maximum time for which continuous signal transmission is possible, after the channel access procedure, may be limited according to the MCOT defined for each nation, region, or frequency band according to each unlicensed band, and may also be limited according to the type of the transmitting device (e.g., a base station, a terminal, a master device, or a slave device). For example, in Japan, a base station or a terminal may perform a channel access procedure through a GHz unlicensed band and then occupy the channel for a maximum time of 4 ms, without performing an additional channel access procedure with regard to the unlicensed band deemed to be in an idle state, thereby transmitting signals.

More specifically, if a base station or a terminal wants to transmit a downlink or uplink signal through an unlicensed band, the channel access procedure that the base station or the terminal can perform may be divided into at least the following types:

Type 1: perform a channel access procedure for a variable time and then transmit up/downlink signals.

Type 2: perform a channel access procedure for a fixed time and then transmit up/downlink signals.

Type 3: transmit downlink or uplink signals without performing a channel access procedure.

A transmitting node that wants to transmit a signal through an unlicensed band may determine the channel access procedure type according to the type of the signal to be transmitted. In the following description, it is assumed that the transmitting node is a base station for convenience of description. Accordingly, the transmitting node and the base station may be used interchangeably, and a receiving node and a terminal may be used interchangeably. The following description can also be identically applied when the transmitting node is a terminal, and the receiving node is a base station.

For example, if the base station wants to transmit a downlink signal including a downlink data channel through an unlicensed band, the base station may perform the Type 1 channel access procedure. If the base station wants to transmit a downlink signal including no downlink data channel through the unlicensed band, e.g., a synchronization signal or a downlink control channel is to be transmitted, the base station may perform the Type 2 channel access procedure and then transmit the downlink signal.

It is also possible to determine the channel access procedure type according to the transmission length of the signal to be transmitted through the unlicensed band, or according to the length of the interval or time for which the unlicensed band is occupied and used. In general, the channel access procedure may need to be performed for a longer time in Type 1, than when the channel access procedure is performed in Type 2. Accordingly, a Type 2 channel access procedure may be performed when signals are to be transmitted for a short time interval or for a time less than or equal to a reference time (e.g., X ms or Y symbols). In contrast, a Type 1 channel access procedure may be performed when signals are to be transmitted for a long time interval or for a time great than the reference time. In other words, a different type of channel access procedure may be performed according to the unlicensed band usage time.

If a Type 1 channel access procedure is performed according to at least one of the above-mentioned standards, the transmitting node may determine the channel access priority class according to the quality of service (QoS) class identifier (QCI) of the signal to be transmitted through the unlicensed band, and may perform the channel access procedure by using at least one of the predefined configuration values given in Table 1 below with regard to the determined channel access priority class.

Table 1 below describes a mapping relation between the channel access priority class and the QCI.

For example, QCI 1, 2, and 4 refer to QCI values related to services such as conversational voice, conversational video (live streaming), and non-conversational video (buffered streaming). If the transmitting node wants to transmit a signal related to a service that does not match with any QCI value in Table 1 through an unlicensed band, the transmitting node may select a QCI closest to one of the QCIs in Table 1, and may select a channel access priority class corresponding thereto.

TABLE 1

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

In connection with the determined channel access priority (p), the defer duration, the set of values or sizes of the contention window (CW_p), the minimum and maximum values of the contention window (CW_min,p and CW_max,p), the maximum channel occupiable interval (T_mcot,p), etc., may be determined based on Table 2 below, which enumerates above values according to the channel access priority class in the case of the downlink.

TABLE 2

| Channel Access Priority Class (P) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Figure 2:
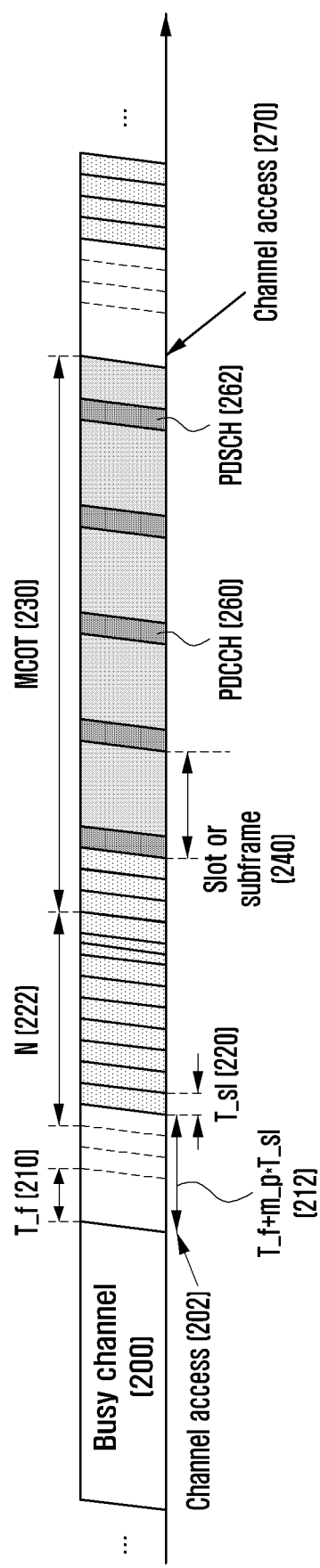
FIG. 2 illustrates a channel access procedure in connection with an unlicensed band according to an embodiment.

FIG. 2 illustrates a channel access procedure in connection with an unlicensed band according to an embodiment.

Referring to FIG. 2, if a base station wants to transmit a downlink signal through an unlicensed band, the base station initially performs a channel access procedure with regard to the unlicensed band for a minimum time of T_f+m_p*T_sl 212. If the base station wants to perform a channel access procedure based on channel access priority class 3 (p=3), the size of the defer duration T_f+m_p*T_sl 212 necessary to perform the channel access procedure is determined by using m_p=3. The value of T_f 210 is fixed as 16 us, the initial time of T_sl 220 among the same needs to correspond to an idle state, and the base station may not perform the channel access procedure for the remaining time T_f−T_si after time T_sl 220 among time T_f 210. Even if the base station has performed the channel access procedure for the remaining time T_f−T_sl, the result of channel access procedure is not used. In other words, the time T_f−T_sl corresponds to a time for which the base station defers to perform the channel access procedure.

If it is determined that the unlicensed band is in an idle state for the entire time of m_p*T_sl, N=N−1. In this case, N 222 is selected as an arbitrary integer value among values between 0 and the value of the contention window (CW_p in Table 2) when the channel procedure is performed. In channel access priority class 3, the minimum contention window value and the maximum contention window valued are 15 and 63, respectively. If it is determined that the unlicensed band is in an idle state in the defer duration and in the additional channel access procedure performing interval, the base station may transmit signals through the unlicensed band for the time of T_mcot,p (8 ms).

Table 2 above enumerates channel access priority classes with regard to the downlink. Although downlink channel access priority classes will be used in the disclosure for convenience in description, the channel access priority classes in Table 2 may be reused for the uplink, or channel access priority classes may be separately defined and used for uplink transmission.

The initial contention window value CW_p is the minimum value of the contention window CW_min,p. After selecting the value of N 222, the base station may perform the channel access procedure in the interval of T_sl 220. If it is determined, as a result of the channel access procedure performed in the interval T_sl 220, that the unlicensed band is in an idle state, the value may be changed to N=N−1. If N=0, the base station may transmit signals through the unlicensed band for a maximum time of T_mcot,p. If it is determined, as a result of the channel access procedure performed in the interval of T_sl 220, that the unlicensed band is not in an idle state, the base station may perform the channel access procedure again without changing the value of N.

If one or more terminals receive downlink data transmitted through a downlink data channel by using a reference subframe or reference slot, and if the terminals transmit or report the results (ACK/NACK) of receiving the downlink data (received by using the reference subframe or reference slot) to the base station, then the size of the value of the contention window CW_p may be changed or maintained according to the ratio (Z) of NACKs among the results. The reference subframe or reference slot may be determined as the timepoint at which the base station initiates the channel access procedure, the timepoint at which the base station selects the value of N in order to perform the channel access procedure, or the downlink signal transmission interval (or MCOT) transmitted most recently by the base station through the unlicensed band immediately before the two timepoints.

The timepoint 270 when the base station initiates the channel access procedure, the timepoint when the base station selects the value of N in order to perform the channel access procedure, or the first slot or subframe 240 of the downlink signal transmission interval (i.e., the channel occupancy time (COT)) 230 transmitted most recently by the base station through the unlicensed band immediately before the two timepoints, may be defined as the reference slot or subframe. Specifically, a subframe 240 including at least the first slot or subframe of the COT 230, a signal being transmitted through the entire slot or subframe, may be defined as the reference slot or subframe. In addition, if the COT starts after the first symbol of a slot or subframe, the slot or subframe that starts downlink signal transmission, and the first subframe, a signal being transmitted through the entire subframe, may be defined as the reference slot or subframe. If one or more terminals receive downlink data transmitted through a downlink data channel of such a reference slot or subframe, and if the ratio of NACKs among the results of receiving the downlink data, which are transmitted or reported to the base station by the terminals, is greater than or equal to Z, then the base station determines that the value or size of the contention window used for the channel access procedure 270 of the corresponding base station is the next contention window larger than the contention window used for the previous channel access procedure 202, i.e., increases the contention window size, and performs the channel access procedure 270.

If the base station cannot receive a report of the result of receiving the downlink data channel transmitted through the first slot or subframe of the COT 230, e.g., if the time interval between the first subframe and the timepoint 270 at which the base station initiates the channel access procedure is less than or equal to n slots or subframes (if the base station initiates the channel access procedure before the time at which terminals can report the downlink data channel receiving results with regard to the first subframe), the first subframe of the most recent COT transmitted before the COT 230 becomes the reference subframe.

If the base station cannot receive, from terminals, the results of receiving downlink data transmitted through the reference subframe 240 at the timepoint 270 at which the base station initiates the channel access procedure, at the timepoint at which the base station selects the value of N in order to perform the channel access procedure, or immediately before the same, the base station may determine that the first subframe of the most recently transmitted COT, among the results of receiving the downlink data channel already received from terminals, is the reference subframe. In addition, the base station may determine the size of the contention window used for the channel access procedure 270 by using the results of receiving downlink data received from the terminals with regard to downlink data transmitted through the downlink data channel in the reference subframe.

For example, if the base station has transmitted a downlink signal through a channel access procedure (e.g., CW_p=15) configured based on channel access priority class 3 (p=3), and if at least 80% of the terminals' results of receiving downlink data transmitted to the terminals through the downlink data channel by using the first subframe, among downlink signals transmitted through the unlicensed band, are confirmed as NACKs, the base station may increase the contention window from the initial value (CW_p=15) to the next contention window value (CW_p=31).

If it is not determined that at least 80% of the terminals' receiving results are NACKs, the base station may maintain the existing value of the contention window or change the same to the initial value of the contention window. The contention window change may be commonly applied to all channel access priority classes or only to the channel access priority class used for the channel access procedure. A method for determining a receiving result useful for determining the contention window size change, i.e., a method for determining the value of Z, among results of receiving downlink data, which have been transmitted or reported from the terminals to the base station with regard to downlink data transmitted through the downlink data channel, in connection with the reference subframe or reference slot used to determine the contention window size change, may be performed as described below.

If the base station transmits at least one codeword or TB to at least one terminal by using a reference subframe or reference slot, the base station may determine the value of Z from the ratio of NACKS among receiving results transmitted or reported by the terminals with regard to the TB received by using the reference subframe or reference slot. For example, if two codewords or two TBs are transmitted to one terminal by using the reference subframe or reference slot, the results of receiving downlink data signals related to the two TBs are transmitted or reported from the terminal to the base station. If the ratio Z of NACKs among the two receiving results is greater than or equal to a threshold value (e.g., Z=80%) defined in advance or configured between the base station and the terminal, the base station may increase or change the contention window size.

If the terminal bundles results of receiving downlink data regarding at least one subframe (e.g., M subframes), including the reference subframe or slot, and then transmits or reports the same to the base station, the base station may determine that the terminal has transmitted M receiving results. In addition, the base station may determine the value of Z based on the ratio of NACKs among the M receiving results and change, maintain, or initialize the contention window size.

If the reference subframe corresponds to a receiving result related to the second slot of two slots constituting one subframe, the value of Z may be determined based on the ratio of NACKs among receiving results transmitted or reported from the terminal to the base station with regard to downlink data received by using the reference subframe (i.e., the second slots) and the next subframe.

Herein, it is assumed that scheduling information regarding a downlink data channel transmitted by the base station or downlink control information is transmitted through a cell that transmits a downlink data channel (e.g., a PDSCH) 262, a cell identical to the frequency band, or a frequency band control channel (e.g., a PDCCH) 260, or it is assumed that scheduling information regarding a downlink data channel transmitted by the base station or downlink control information is transmitted through an unlicensed band, but is transmitted through a cell different from the cell that transmits the downlink data channel, or at a different frequency. Under one of the above assumptions, if it is determined that the terminal has transmitted no result of receiving downlink data received by using the reference subframe or reference slot, and if it is determined that the result of receiving downlink data transmitted by the terminal is at least one of discontinuous transmission (DTX), NACK/DTX, or any state, the base station may determine the value of Z by regarding the terminal's receiving result as a NACK.

In addition, if scheduling information regarding the downlink data channel transmitted by the base station or downlink control information is transmitted through a licensed band, and if it is determined that the result of receiving downlink data transmitted by the terminal is at least one of DTX, NACK/DTX, or any state, the base station may not make the terminal's receiving result included in the reference value Z of contention window change. That is, the base station may determine the value of Z without considering the terminal's receiving result.

In addition, if the base station transmits scheduling information regarding the downlink data channel or downlink control information through a licensed band, and if the base station has not actually transmitted downlink data (no transmission) among results of receiving downlink data related to the reference subframe or reference slot, which are transmitted or reported from the terminals to the base station, the base station may determine the value of Z without considering the receiving results transmitted or reported by the terminals with regard to downlink data.

Figure 3:
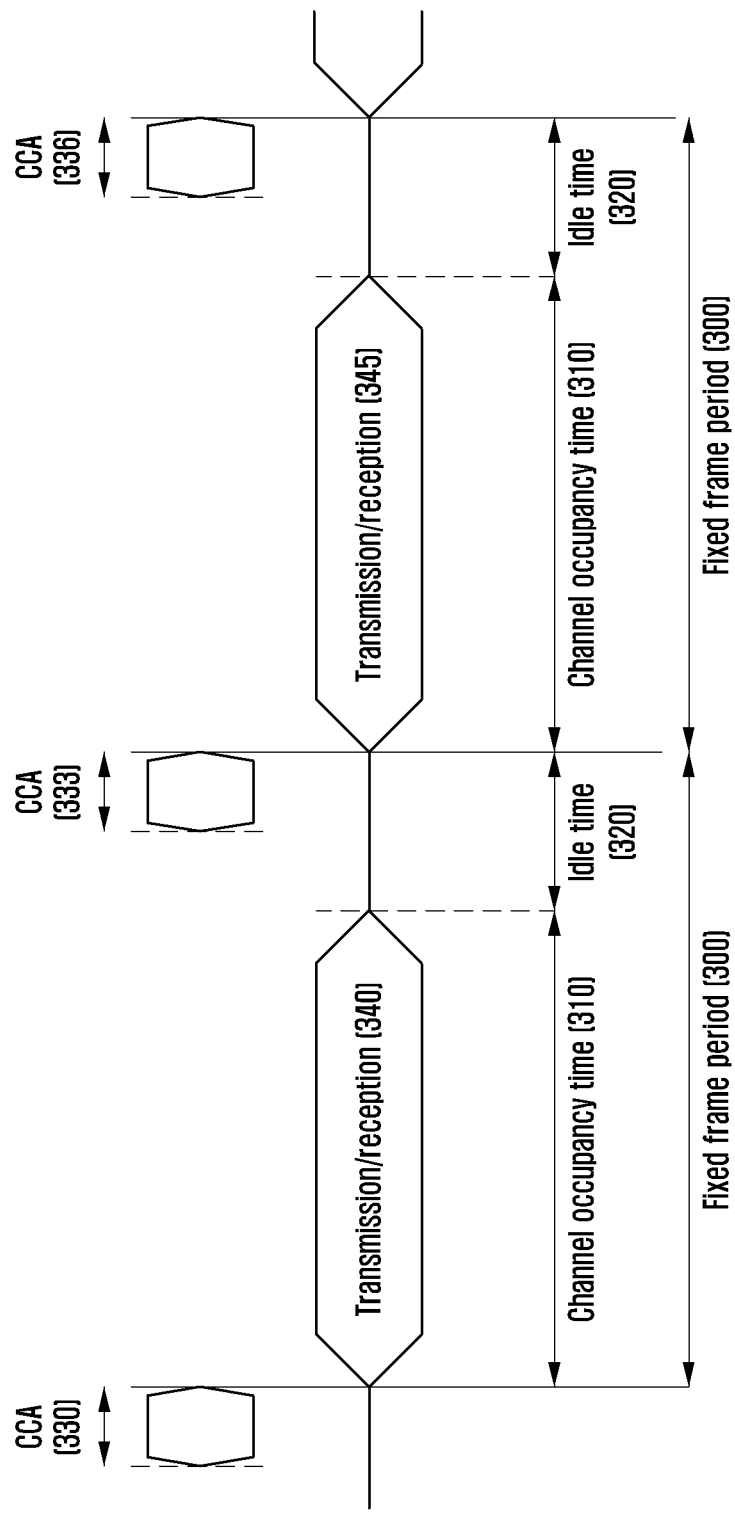
FIG. 3 illustrates a channel access procedure in connection with an unlicensed band according to an embodiment.

FIG. 3 illustrates a channel access procedure in connection with an unlicensed band according to an embodiment.

Referring to FIG. 3, a device performing a frame-based channel access procedure may periodically transmit/receive a signal according to a fixed frame period (FFP). The FFP 300 may be declared or configured by the transmitting device (e.g., the base station), and the FFP may be configured to be 1 ms to 10 ms. A channel access procedure related to the unlicensed band (or a clear channel access (CCA)) may be performed immediately before every frame period is initiated (330, 333, and 336), and the channel access procedure is performed for a fixed time or for one observation slot, as in the above-described Type 2 channel access procedure. If it is determined, as a result of the channel access procedure, that the unlicensed band is in an idle state or is an idle channel, the transmitting device may transmit/receive signals without any separate channel access procedure for a time 310 corresponding to a maximum of 95% of the FFP 300 (hereinafter, referred to as COT) (340 and 345). The time corresponding to a minimum of 5% of the FFP 300 is an idle time 320, for which no signals can be transmitted/received, and the channel access procedure may be performed within the idle time 320.

The frame-based channel access procedure has an advantage in that, compared with a traffic-based channel access procedure, the channel access procedure is simpler to perform, and unlicensed band channel access can be performed periodically. However, there is a drawback in that, since the channel access procedure initiation timepoint is fixed, the probability that the unlicensed band can be accessed is lower than in the case of the traffic-based channel access procedure.

A 5G system needs to flexibly define and manage the frame structure in view of various services and requirements. For example, it may be considered to give each service a different subcarrier spacing according to the requirement. A scheme for supporting multiple subcarrier spacings in a current 5G communication system may be determined using Equation (1) below:

$$\Delta f = f_0 * 2^m \quad (1)$$

In Equation (1), $f_0$ refers to the basic subcarrier interval of the system, and m refers to an integer scaling factor. For example, if $f_0$ is 15 kHz, the set of subcarrier spacings of the 5G communication system may include 3.75 kHz, 7.5 kHz, 15 kHz, 30 kHz, 60 kHz, 120 kHz, 240 kHz, 480 kHz, etc. The available set of subcarrier spacings may vary depending on the frequency band. For example, in a frequency band less than or equal to 6 GHz, 3.75 kHz, 7.5 kHz, 15 kHz, 30 kHz, or 60 kHz may be used and, in a frequency band greater than 6 GHz, 60 kHz, 120 kHz, or 240 kHz may be used.

The length of an OFDM symbol may vary depending on the spacing between subcarriers constituting the corresponding OFDM symbol because the subcarrier spacing and the length of the OFDM symbol is inversely proportional to each other, which is one of characteristics of OFDM symbols. For example, if the subcarrier spacing doubles, the symbol length becomes half; if the subcarrier spacing becomes half, the symbol length doubles.

Figure 4:
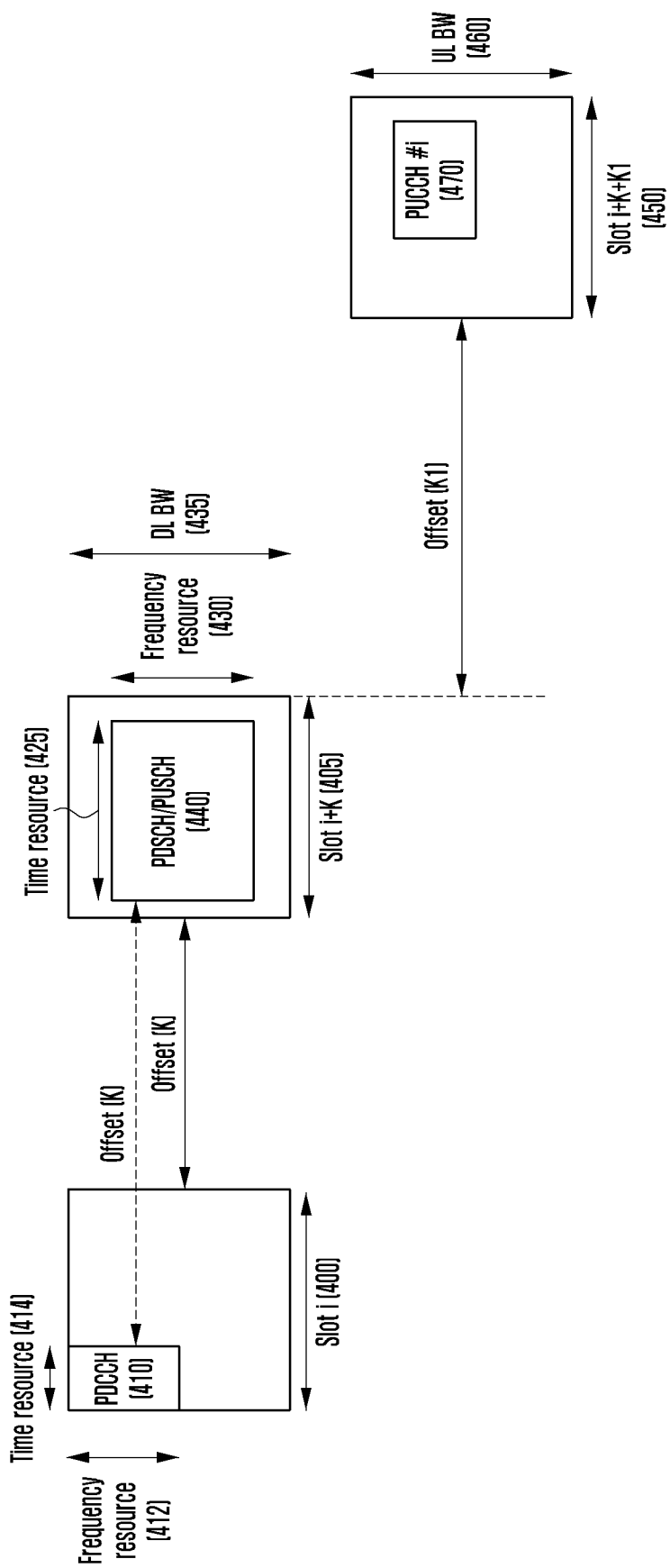
FIG. 4 illustrates downlink or uplink scheduling, a HARQ-ACK feedback method, and a resource domain in an NR system according to an embodiment.

FIG. 4 illustrates downlink or uplink scheduling in an NR system according to an embodiment, a HARQ-ACK feedback method related thereto, and a resource domain.

Referring to FIG. 4, a resource domain in which a data channel is transmitted in a 5G or NR communication system is illustrated. The terminal monitors or searches for a PDCCH 410 in a downlink control channel (or PDCCH) domain configured through an upper-level signal from the base station (a control resource set (CORESET) or search space (SS)). The PDCCH domain includes time domain 414 and a frequency domain 412 information. The time domain 414 information may be configured with regard to each symbol, and the frequency domain 412 information may be configured with regard to each RB or each group of RBs.

If the terminal detects the PDCCH 410 in slot i 400, the terminal acquires DCI transmitted through the detected PDCCH 410. Through the received DCI, the terminal may acquire scheduling information regarding the downlink data channel or uplink data channel. The DCI may at least include information regarding the resource domain (or PDSCH transmission domain) in which the terminal should receive the downlink data channel transmitted from the base station (e.g., a PDSCH), or information regarding the resource domain assigned to the terminal from the base station in order for the terminal to transmit the uplink data channel (e.g., a PUSCH).

For example, after receiving the DCI, the terminal may acquire the slot index to transmit the PDSCH through the DCI, or acquire offset information K, and may determine a PDSCH receiving slot index. With reference to the slot index i 400 used to receive the PDSCH 410, the terminal may determine that the same is scheduled to transmit the PDSCH through slot i+K 405 based on the received offset information K. With reference to the CORESET used to receive the PDCCH 410, the terminal may determine slot i+K 405 or the PDSCH starting symbol or time in the slot i+K, based on the received offset information K.

In addition, the terminal may acquire information regarding the PDSCH receiving time-frequency resource domain 440 in the PDSCH transmitting slot 405 from the DCI. The PDSCH receiving frequency resource domain information 430 may include a PRB or PRB group unit information. The PDSCH receiving frequency resource domain information 430 may correspond to a domain included in the initial uplink bandwidth (BW) determined or configured for the terminal through the initial access procedure, or in the initial uplink bandwidth part (BWP). If the terminal has a DL BW 435 or a downlink BWP configured therefor through an upper-level signal, the PDSCH receiving frequency resource domain formation 430 may correspond to a domain included in the DL BW 435 or BWP configured through the upper-level signal.

The PDSCH receiving time resource domain information 425 may be symbol or symbol group unit information, or information indicating absolute time information. The PDSCH receiving time resource domain information 425 may be expressed as a combination of the PDSCH receiving start time or symbol and the length of the PDSCH or the PDSCH ending time or symbol, and may be included in the DCI as a single field or value. The PDSCH receiving time resource domain information 425 may be included in the DCI as a field or value indicating each of the PDSCH receiving start time or symbol and the length of the PDSCH or the PDSCH ending time or symbol. The terminal may receive the PDSCH in the PDSCH transmitting resource domain 440 determined based on the DCI.

After receiving the PDSCH 440, the terminal may report (feedback) the result of receiving the PDSCH 440 (HARQ-ACK) to the base station. The PUCCH 470 transmission resource for transmitting the result of receiving the PDSCH 470 may be determined by the terminal using a PDSCH-to-HARQ timing indicator and a PUCCH resource indicator, which are indicated through the DCI 410 that schedules the PDSCH 440. For example, after receiving the PDSCH-to-HARQ timing indicator KI through the DCI 410, the terminal transmits the PUSCH 470 through the slot 450 that comes after KI from the slot 405 used to receive the PDSCH 440. The PUCCH 470 transmission resource in the PUCCH transmission slot 450 performs PUCCH transmission by using the resource indicated by the PUCCH resource indicator of the DCI 410. If the terminal is configured or instructed to transmit multiple PUCCHs through the PUCCH transmission slot 450, the terminal may transmit the PUCCHs by using a PUCCH resource other than the resource indicated by the PUCCH resource indicator of the DCI 410.

In a 5G communication system, a slot format indicator (SFI) may be used to indicate whether each OFDM symbol constituting one slot is a downlink symbol, an uplink symbol, or a flexible symbol, in order to dynamically change the downlink signal transmission and uplink signal transmission intervals in a time division duplex (TDD) system. A symbol indicated as a flexible symbol may be neither a downlink symbol nor an uplink symbol, or may refer to a symbol that can be changed to a downlink or uplink symbol according to terminal-specific control information or scheduling information. The flexible symbol may include a gap guard for use in the process of switching from the downlink to the uplink.

The SFI may be transmitted simultaneously to multiple terminals through a terminal group (or cell) common control channel. That is, the SFI may be transmitted through a PDCCH that is CRC-scrambled by an identifier (e.g., an SFI-RNTI) different from the terminal-specific identifier (e.g., a C-RNTI). The SFI may include information regarding N slots, the value of N may be an integer greater than zero or a natural number, or may be a value configured from a set of values that can be predefined, such as 1, 2, 5, 10, and 20, based on an upper-level signal from the base station to the terminals. The size of the SFI information may be configured by the base station for the terminal through an upper-level signal. Examples of slot formats that the SFI can indicate are given in Table 3 below.

TABLE 3

| Format | \multicolumn{14}{c}{Symbol number (or index) within one slot} |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | U |
| 4 | D | D | D | D | D | D | D | D | D | D | D | D | X | U |
| 5 | D | D | D | D | D | D | D | D | D | D | X | X | X | U |
| 6 | D | D | D | D | D | D | D | D | D | X | X | X | X | U |
| 7 | D | D | D | D | D | D | D | X | X | X | X | X | X | U |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | D | D | D | D | D | D | D | X |
| 47 | D | D | D | D | X | X | D | D | D | D | D | X | X | X |
| 48 | D | D | X | X | X | X | D | D | X | X | X | X | X | X |
| 49 | D | X | X | X | X | X | D | X | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | U | D | X | X | X | X | X | X | U |
| 61 | D | D | X | X | X | X | U | D | D | X | X | X | X | U |
| 62-254 | \multicolumn{14}{c}{Reserved} |
| 255 | \multicolumn{14}{l}{UE determines the slot format for the slot based on tdd-UL-DL-ConfigurationCommon, tdd-UL-DL-ConfiguratitonCommon2, or tdd-UL-DL-ConfigDedicated and, if any, on detected DCI formats} |

In Table 3, D refers to a downlink, U refers to an uplink, and X refers to a flexible symbol. The total number of slot formats that can be supported in Table 3 is 256. The maximum size of the SFI information bits in the current NR system is 128 bits, and the SFI information bits correspond to a value that the base station can configure for the terminal through an upper-level signal (e.g., dci-PayloadSize).

The SFI information may include a slot format regarding multiple serving cells, and the same may be distinguished through a serving cell identifier (ID). In addition, with regard to each serving cell, a combination of SFIs regarding one or more slots (a slot format combination) may be included. For example, if the size of SFI information bits is 3 bits, and if an SFI is configured for each serving cell, the three-bit SFI information may configure a total of eight SFIs or SFI combinations (hereinafter, referred to as SFIs), and the base station may indicate one of the eight SFIs through terminal group common DCI (hereinafter, referred to as SFI information).

At least one of the eight SFIs may include an SFI regarding multiple slots. For example, Table 4 below gives an example of the three-bit SFI information including the slot formats in Table 3. Five pieces of information (slot formation combination ID 0, 1, 2, 3, 4) among the SFI information correspond to SFIs regarding one slot, and the remaining three correspond to information regarding SFIs related to four slots (slot format combination ID 5, 6, 7), and are successively applied to the four slots.

TABLE 4

| Slot format combination ID | Slot Formats |
| --- | --- |
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

The terminal receives configuration information regarding a PDCCH from which SFI information is to be detected, based on an upper-level signal, and detects an SFI according to the configuration. For example, the terminal receives configurations, based on an upper-level signal, regarding a CORESET from which the SFI information should be detected, a search space, information regarding the RNTI used for CRC scrambling of the DCI by which the SFI information is transmitted, and information regarding the period and offset of the search space.

Figure 5:
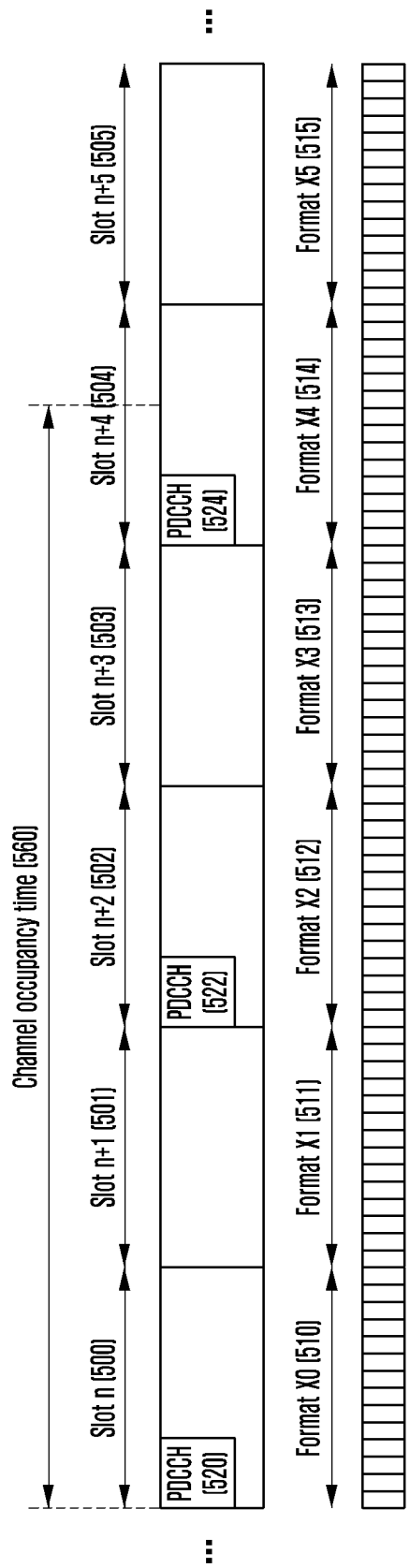
FIG. 5 illustrates a slot format indicator or a channel occupancy time in an NR system according to an embodiment.

FIG. 5 illustrates a channel occupancy time according to an embodiment.

Referring to FIG. 5, PDCCH domains 520, 522, and 524 are illustrated in which the terminal should detect SFI information, wherein the PDCCH domains have a period including two slots. The terminal may detect DCI that is CRC-scrambled by a slot format indicator identifier (i.e., SFI-RNTI) from the PDCCH domains 520, 522, and 524 in slot n 500, slot n+2 502, and slot n+4 504, according to the configured PDCCH domains and the period thereof, and may acquire the SFI regarding two slots through the detected DCI. The detected DCI may include SFI information regarding two or more slots, and the number of slots that the included SFI is to indicate may be configured through an upper-level signal. Configuration information regarding the number of slots that the included SFI is supposed to indicate may be included in the same upper-level signal as the upper-level signal for configuring the SFI information. For example, FIG. 5 illustrates the terminal acquiring SFI information 510 and 511 regarding slot n 500 and slot n+1 501 from the PDCCH domain 520 of slot n 500. The SFI information 510, 511, 512, 513, 514, and 515 refers to the formats given in Table 3, and may indicate slot formats corresponding thereto, respectively.

If SFI information is transmitted through an unlicensed band, particularly, if SFI information includes SFIs regarding multiple slots, the base station may fail to determine SFI information with regard to at least one slot, depending on whether or not unlicensed band channel access is made. For example, if the base station in FIG. 5 has performed a channel access procedure in connection with the unlicensed band before slot n 500, if the base station has determined through the channel access procedure that the channel is in an idle state, and if the base station accordingly occupies and uses the channel from slot n 500 to slot n+4 504, then the base station cannot determine the SFI of slot i+5 505 because the base station cannot predict the result of the channel access procedure through the unlicensed band in connection with slot n+5 505. Accordingly, there is a need for a method for determining how SFI information of slot n+5 505 will be indicated when the base station transmits SFI information 514 and 515 regarding slot n+4 504 and slot n+5 505 through the PDCCH 524. For example, the base station may indicate that the SFI regarding time, other than the channel occupancy time 560, is flexible.

Figure 6:
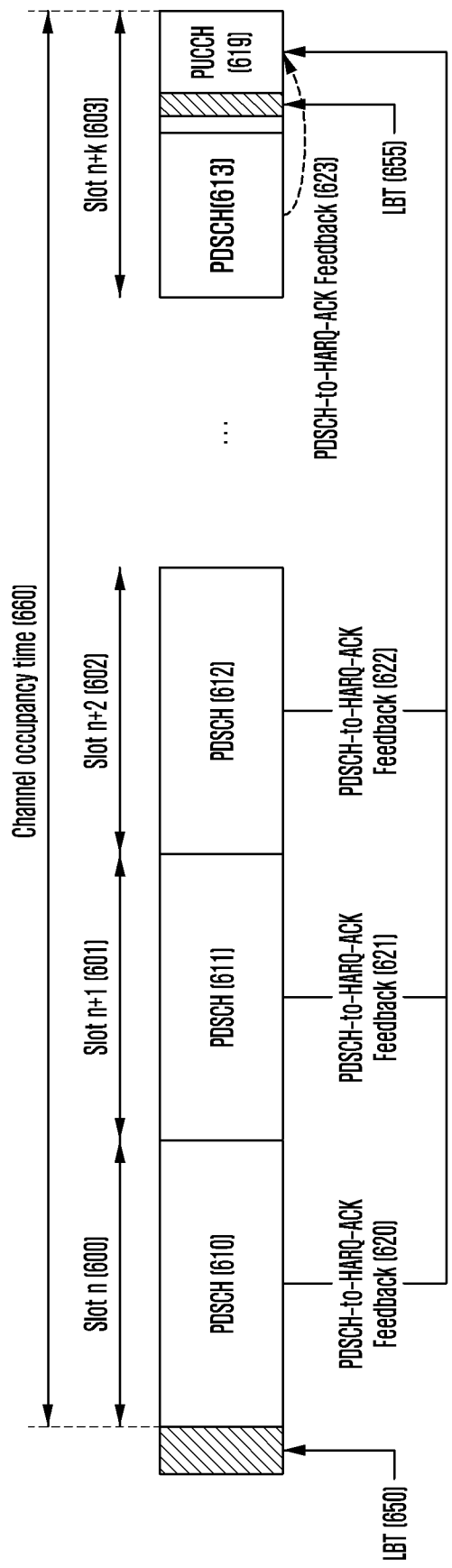
FIG. 6 illustrates a HARQ-ACK feedback method according to an embodiment.

FIG. 6 illustrates a HARQ-ACK feedback time regarding PDSCH reception according to an embodiment.

Referring to FIG. 6, if an idle state is confirmed after performing a channel access procedure 650 with regard to an unlicensed band, the base station may access the unlicensed band and perform up/downlink communication with the terminal for the channel occupancy time 660. If the terminal transmits an uplink signal 619 for the channel occupancy time 660 of the base station, the terminal may need to perform a channel access procedure 655 immediately before initiating the uplink signal transmission. The downlink-uplink change may be minimized to perform an additional channel access procedure in a minimized manner within the channel occupancy time 660 of the base station. For example, FIG. 6 illustrates the downlink-uplink change occurring once in the channel occupancy time 660 of the base station.

More specifically, in FIG. 6, the base station makes a configuration or an instruction such that symbols ranging from the starting slot n 600 of the channel occupancy time 660 to some symbols of the last slot n+k 603 are used to transmit a downlink signal, and the terminal can transmit an uplink signal by using some symbols of the last slot n+k 603 of the channel occupancy time 603, thereby minimizing the downlink-uplink change in the channel occupancy time 660.

To this end, the base station should instruct the terminal to transmit a HARK-ACK feedback 620 regarding the PDSCH 610 in slot n 610 through the PUCCH 619 in slot n+k 603. Accordingly, there is a need for a method for the base station to instruct the terminal to transmit a HARK-ACK feedback 620 regarding the PDSCH 610 scheduled in the first slot 600 within the channel occupancy time 660 through the last slot 603 within the channel occupancy time 660 of the base station. For example, for a terminal receiving a PDSCH in slot n at a subcarrier spacing of 60 kHz, k is 39 with reference to the maximum channel occupancy time 10 ms of the base station, and thus, it should be able to indicate the HARQ-ACK feedback timing regarding 40 slots, and the DCI should use an indicator field of at least six bits in this case. Therefore, the disclosure provides a method capable of indicating the HARQ-ACK feedback timing more efficiently.

In the following description of the disclosure, a base station transmitting a downlink signal to a terminal through an unlicensed band and a terminal transmitting an uplink signal to a base station through an unlicensed band will be referred to interchangeably, but the content presented in the disclosure is equally applicable (or applicable after a partial modification) to either scenario. Therefore, detailed description of downlink signal transmission/reception will be omitted herein. It is also assumed herein that a single piece of downlink data information (codeword or TB) or uplink data information is transmitted/received between the base station and the terminal. However, the content presented in the disclosure is also applicable to a base station transmitting a downlink signal to multiple terminals, or to multiple codewords or TBs being transmitted/received between a base station and a terminal. The content presented in the disclosure is also applicable to a base station or a terminal grouping one or multiple code blocks that constitute one TB and transmitting/receiving signals by using each code block group (CBG) as a unit.

Methods and apparatuses provided in following embodiments are not limitedly applied to respective embodiments, and it will be possible to utilize a combination of all or some of one or more embodiments provided in the disclosure in connection with a method and an apparatus for determining SFI information. In addition, although embodiments will be described in connection with a base station delivering SFI information to a terminal through DCI, and the terminal, after receiving the same, making use of the received SFI information, the same will also be applicable to the opposite scenario in which the terminal delivers SFI information to the base station through uplink control information (UCI), and the base station, after receiving the same, makes use of the received SFI information. Although it is assumed herein that a base station and a terminal operate in an unlicensed band, methods and apparatuses provided in the embodiments are also applicable to a base station and a terminal operating in a licensed band or shared spectrum.

In addition, although it is assumed herein that SFI information is transmitted to a specific terminal or a specific group of terminals through a PDCCH, it is also possible to use SFI information transmitted to a terminal through an upper-level signal (or uplink-downlink configuration information (UL-DL-Configuration)).

Although embodiments will be described with reference to a terminal receiving a downlink data channel (a PDSCH) from a base station, embodiments provided in the disclosure are also applicable to a terminal transmitting an uplink data channel (e.g., a PUSCH) to a base station. In addition, although it is assumed in the description that SFIs regarding multiple slots are transmitted simultaneously, the embodiments provided in the disclosure are also applicable to when an SFI regarding one slot is transmitted. In addition, in the following description, an SFI that indicates whether symbols included in at least one slot are uplink symbols, downlink symbols, or flexible symbols may be used interchangeably with a slot format indicator, an SFI, or slot configuration information. In addition, the slot format indicator may also be referred to as channel occupancy time information or the like because it is possible to indicate the time for which the base station or the terminal occupies an unlicensed band channel through the slot format indicator.

Embodiment 1

In accordance with an embodiment, a method is provided, wherein, in connection with a base station and a terminal operating in an unlicensed band, the base station indicates a HARQ-ACK feedback time to the terminal such that the terminal, after receiving a PDSCH transmitted within a channel occupancy time during which the base station has accessed the channel through a channel access procedure, can transmit the result of receiving the PDSCH within the channel occupancy time.

The terminal may receive DCI transmitted through a PDCCH in a CORESET configured by the base station, and may receive the PDSCH according to information indicated by the received DCI. The terminal may report (feedback) the result of receiving the PDSCH, i.e., HARQ-ACK information, to the base station through a PUCCH or PUSCH in the slot indicated through the PDSCH-to-HARQ_feedback timing indicator field included in the DCI. For example, if the terminal is scheduled to receive a PDSCH in slot n, then the terminal reports the result of receiving the PDSCH to the base station through the PUCCH or PUSCH in slot k indicated by the PDSCH-to-HARQ feedback timing indicator field included in the PDSCH scheduling DCI, e.g., slot n+k. The PDSCH-to-HARQ_feedback timing indicator may be configured as in Table 5 below:

TABLE 5

| PDSCH-to-HARQ_feedback timing indicator | | | |
|---|---|---|---|
| 1 bit | 2 bit | 3 bit | Number of slots k |
| 0 | 00 | 000 | $1^{st}$ value provided by dl-DataToUL-ACK |
| 1 | 01 | 001 | $2^{nd}$ value provided by dl-DataToUL-ACK |
|  | 10 | 010 | $3^{rd}$ value provided by dl-DataToUL-ACK |
|  | 11 | 011 | $4^{th}$ value provided by dl-DataToUL-ACK |
|  |  | 100 | $5^{th}$ value provided by dl-DataToUL-ACK |
|  |  | 101 | $6^{th}$ value provided by dl-DataToUL-ACK |
|  |  | 110 | $7^{th}$ value provided by dl-DataToUL-ACK |
|  |  | 111 | $8^{th}$ value provided by dl-DataToUL-ACK |

The value indicated by the PDSCH-to-HARQ_feedback timing indicator may differ depending on the size or format of the DCI used to schedule the PDSCH. For example, when transmitting the result of receiving a PDSCH scheduled through fallback DCI (e.g., DCI format 1_0), the values of the PDSCH-to-HARQ_feedback timing indicator in Table 5 above may be mapped to slots (1, 2, 3, 4, 5, 6, 7, 8), respectively. The fallback DCI may be included as a PDSCH-to-HARQ_feedback timing indicator field having a fixed bit size (e.g., three bits). When transmitting the result of receiving a PDSCH scheduled through non-fallback CDI (e.g., DCI format 1_1), the value of PDSCH-to-HARQ_feedback timing indicator may be configured through upper-level signal dl-DataToUL-ACK as in Table 5, dl-DataToUL-ACK may be one of integer values from 0 to 15, and the dl-DataToUL-ACK information is included in PUCCH-config information as in Table 6 below:

TABLE 6

| PUCCH-Config ::= | SEQUENCE { |
|---|---|
| ... | |
| dl-DataToUL-ACK | SEQUENCE (SIZE (1...8)) OF INTEGER (0...15) |
|  | OPTIONAL, -- Need M |
| ... | |
| } | |

The size of PDSCH-to-HARQ_feedback timing indicator field included in the non-fallback DCI according to upper-level signal configuration may vary from 0 to 3 bits as in Table 5, and the size thereof is ceiling(log 2(I)), wherein I refers to the number of parameter dl-DataToUL-ACK configured through an upper-level signal. If only one dl-DataToUL-ACK value (e.g., value k) is configured, the non-fallback DCI does not include the PDSCH-to-HARQ_feedback timing indicator field. That is, the size of the PDSCH-to-HARQ_feedback timing indicator field is 0. The terminal scheduled to receive a PDSCH, based on the non-fallback DCI, in slot n transmits a HARQ-ACK feedback regarding the PDSCH by using slot n+k.

The value indicated through the PDSCH-to-HARQ_feedback timing indicator field is determined with reference to the slot used to transmit the PUCCH for transmitting the HARQ-ACK feedback. If the PDCCH or PDSCH subcarrier spacing is greater than or equal to the PUCCH subcarrier spacing for transmitting the HARQ-ACK feedback, PDSCH-to-HARQ_feedback timing indicator k=0 denotes a slot overlapping the PDSCH receiving slot in connection with PUCCH transmission. If the PDCCH or PDSCH subcarrier spacing is less than the PUCCH subcarrier spacing for transmitting the HARQ-ACK feedback, PDSCH-to-HARQ_feedback timing indicator k=0 may denote a slot that ends PUCCH transmission simultaneously with the PDSCH receiving slot.

In connection with a base station and a terminal operating in an unlicensed band, in order for the terminal, after receiving a PDSCH transmitted within a channel occupancy time during which the base station has accessed the channel through a channel access procedure, to transmit the result of receiving the PDSCH within the channel occupancy time, the maximum PDSCH-to-HARQ_feedback timing that the base station can indicate to the terminal may be increased enough to indicate X slots. For example, if the MCOT is 10 ms, and if the subcarrier spacing of the PDCCH or PDSCH is 60 kHz, a total of 40 slots may be included in the MCOT. The base station should be able to make an instruction such that a HARQ-ACK feedback regarding the PDSCH received in slot n can be transmitted in slot n+39. In the above example, PDSCH-to-HARQ_feedback timing indicator should indicate X=39 slots.

Methods for solving this may include:

Method 1: the value that dl-DataToUL-ACK can indicate is expanded to be greater than or equal to X, and the size of the PDSCH-to-HARQ_feedback timing indicator field is increased, thereby expanding the number of slots that can be indicated.

Method 1:

In order for the terminal, after receiving a PDSCH transmitted within the channel occupancy time during which the base station has accessed the channel through a channel access procedure, to transmit the result of receiving the PDSCH within the channel occupancy time, the value that dl-DataToUL-ACK can indicate may be expanded so as to correspond to at least X slots, as defined in Table 7 below.

TABLE 7

| PUCCH-Config ::= | SEQUENCE { |
|---|---|
| ... | |
| dl-DataToUL-ACK (0...39) | SEQUENCE (SIZE (1...8)) OF INTEGER OPTIONAL, -- Need M |
| ... | |
| } | |

In addition, the size of the PDSCH-to-HARQ_feedback timing indicator field included in the DCI may be increased as shown in Table 8 below, such that a larger number of PDSCH-to-HARQ_feedback timing can be indicated. For example, the size of the PDSCH-to-HARQ_feedback timing indicator field may be increased to Y bits, such that PDSCH-to-HARQ_feedback timing can be indicated as many as Y (e.g., 2) times. In this case, slots that can indicate PDSCH-to-HARQ_feedback timing may vary with regard to slots within the channel occupancy time of the base station, according to the size of the Y bits. For example, according to the size of Y bits, PDSCH-to-HARQ_feedback timing may be indicated with regard to all or some of the slots within the channel occupancy time of the base station. In the above example, a total of 40 slots may be included in the channel occupancy time 10 ms of the base station, but, if Y=4 bits, PDSCH-to-HARQ_feedback timing can be indicated with regard to a maximum of 16 slots.

In Table 8 below, the size of the PDSCH-to-HARQ_feedback timing indicator field is 4 bits. In the example above, the size of the PDSCH-to-HARQ_feedback timing indicator field is 6 bits in order to ensure that PDSCH-to-HARQ_feedback timing can be indicated with regard to all of X slots, but it is also possible not to increase the size of the PDSCH-to-HARQ_feedback timing indicator field included in the DCI as in Table 8, or to partially increase the same, and to increase the value that dl-DataToUL-ACK can indicate in the upper-level signal so as to include X (e.g., X=39). However, this may pose a limitation when the base station selects PDSCH scheduling and the PDSCH-to-HARQ_feedback timing indicator within the channel occupancy time, and this may limit operations of the base station.

TABLE 8

| PDSCH-to-HARQ_feedback timing indicator | | | | | |
|---|---|---|---|---|---|
| 1 bit | 2 bit | 3 bit | 4 bit | Number of slots k | Example |
| 0 | 00 | 000 | 0000 | 1$^{st}$ value provided by dl-DataToUL-ACK | 0 |
| 1 | 01 | 001 | 0001 | 2$^{nd}$ value provided by dl-DataToUL-ACK | 3 |
| | 10 | 010 | 0010 | 3$^{rd}$ value provided by dl-DataToUL-ACK | 6 |
| | 11 | 011 | 0011 | 4$^{th}$ value provided by dl-DataToUL-ACK | 9 |
| | | 100 | 0100 | 5$^{th}$ value provided by dl-DataToUL-ACK | 12 |
| | | 101 | 0101 | 6$^{th}$ value provided by dl-DataToUL-ACK | 15 |
| | | 110 | 0110 | 7$^{th}$ value provided by dl-DataToUL-ACK | 18 |
| | | 111 | 0111 | 8$^{th}$ value provided by dl-DataToUL-ACK | 21 |
| | | | 1000 | 9$^{th}$ value provided by dl-DataToUL-ACK | 24 |
| | | | 1001 | 10$^{th}$ value provided by dl-DataToUL-ACK | 27 |
| | | | 1010 | 11$^{th}$ value provided by dl-DataToUL-ACK | 30 |
| | | | 1011 | 12$^{nd}$ value provided by dl-DataToUL-ACK | 33 |
| | | | 1100 | 13$^{th}$ value provided by dl-DataToUL-ACK | 36 |

TABLE 8-continued

| PDSCH-to-HARQ_feedback timing indicator | | | | |
|---|---|---|---|---|
| 1 bit | 2 bit | 3 bit | 4 bit Number of slots k | Example |
| | | | 1101 14$^{th}$ value provided by dl-DataToUL-ACK | 37 |
| | | | 1110 15$^{th}$ value provided by dl-DataToUL-ACK | 38 |
| | | | 1111 16$^{th}$ value provided by dl-DataToUL-ACK | 39 |

The description above with reference to the maximum channel occupancy time being 10 ms, and the subcarrier spacing being 60 kHz is only an example, and the same is also applicable to other various maximum channel occupancy times and subcarrier spacings. For example, if the maximum channel occupancy time is 10 ms, and if the subcarrier spacing is 120 kHz, a maximum of 80 slots can be included in the maximum channel occupancy time. Accordingly, it is possible to use at least one of the method of increasing the range of the value that dl-DataToUL-ACK can indicate in the upper-level signal, and the method of increasing the size of the PDSCH-to-HARQ_feedback timing indicator field included in the scheduling DCI, thereby making it possible to indicate the PDSCH-to-HARQ_feedback timing indicator even in the case of a maximum channel occupancy time of 10 ms and a subcarrier spacing of 120 kHz. Accordingly, as in the method described above for the PDSCH-to-HARQ_feedback timing indicator to indicate the largest number of slots included in the maximum channel occupancy time by using the maximum channel occupancy time allowed in the unlicensed band and the subcarrier spacing configured in the unlicensed band, it is possible to use at least one of the method of increasing the range of the value that dl-DataToUL-ACK can indicate in the upper-level signal, and the method of increasing the size of the PDSCH-to-HARQ_feedback timing indicator field included in the scheduling DCI, thereby making it possible to indicate the PDSCH-to-HARQ_feedback timing.

Method 2: at least one of PDSCH-to-HARQ_feedback timing indicator values that the base station can indicate to the terminal indicates the last slot within the channel occupancy time of the base station.

Method 2:

In Method 2, the base station may use at least one of PDSCH-to-HARQ_feedback timing indicator values to indicate the last uplink slot among slots that can be included within the channel occupancy time. The last uplink slot may refer to the last one of slots in which a PUCCH used by the terminal to transmit the result of receiving a PDSCH within the channel occupancy time exists, or in which an indicated PUCCH resource exists. A case in which the PDSCH-to-HARQ_feedback timing indicator has a 3-bit size will now be described with reference to Table 9 below.

TABLE 9

| PDSCH-to-HARQ_feedback timing indicator | | | |
|---|---|---|---|
| 1 bit | 2 bit | 3 bit | Number of slots k |
| 0 | 00 | 000 | 1$^{st}$ value provided by dl-DataToUL-ACK |
| 1 | 01 | 001 | 2$^{nd}$ value provided by dl-DataToUL-ACK |
| | 10 | 010 | 3$^{rd}$ value provided by dl-DataToUL-ACK |
| | 11 | 011 | 4$^{th}$ value provided by dl-DataToUL-ACK |
| | | 100 | 5$^{th}$ value provided by dl-DataToUL-ACK |
| | | 101 | 6$^{th}$ value provided by dl-DataToUL-ACK |
| | | 110 | 7$^{th}$ value provided by dl-DataToUL-ACK |

TABLE 9-continued

| PDSCH-to-HARQ_feedback timing indicator | | | |
|---|---|---|---|
| 1 bit | 2 bit | 3 bit | Number of slots k |
| | | 111 | Last uplink slot in the indicated channel occupancy time |

The terminal may receive DCI transmitted through a PDCCH based on a CORESET configured by the base station, and may receive a PDSCH according to information indicated by the received DCI. The terminal may report (or feedback) the result of receiving the PDSCH, i.e., HARQ-ACK information, to the base station through the PUCCH or PUSCH in the slot indicated by the PDSCH-to-HARQ_feedback timing indicator field included in the DCI. For example, if the terminal is configured to receive the PDSCH in slot n, the terminal reports the result of receiving the PDSCH to the base station through the PUCCH or PUSCH in the slot k indicated by the PDSCH-to-HARQ_feedback timing indicator field included in the PDSCH scheduling DCI, i.e., slot n+k. At least one value of the PDSCH-to-HARQ_feedback timing indicator may indicate the last uplink transmission slot in the channel occupancy time of the base station. Whether the PDSCH-to-HARQ_feedback timing indicator value (e.g., "111") indicates the last uplink transmission slot within the channel occupancy time of the base station as in Table 9 or indicates slots successively configured by dl-DataToUL-ACK as in Table 8 (e.g., 8$^{th}$ value provided by dl-DataToUL-ACK) may be distinguished through a separate field inside the PUCCH-Config information. Alternatively, one of values that dl-DataToUL-ACK can have may correspond to a value indicating the last uplink transmission slot within the channel occupancy time of the base station (e.g., "X" or "last"), or the same may be defined in advance.

It is also possible to distinguish the indicating value according to the DCI format. For example, when transmitting the result of receiving a PDSCH received based on fallback DCI, the PDSCH-to-HARQ_feedback timing indicator value (e.g., "111") may be the 8$^{th}$ value provided by dl-DataToUL-ACK and, when transmitting the result of receiving a PDSCH received based on non-fallback DCI, the PDSCH-to-HARQ_feedback timing indicator value (e.g., "111") may be used to indicate the last uplink transmission slot within the channel occupancy time of the base station as in Table 9.

Method 2 may also be used together with Method 1. For example, the size of the PDSCH-to-HARQ_feedback timing indicator field may be increased in as in Table 8, and at least value of the PDSCH-to-HARQ_feedback timing indicator indicated by the field having an increased size may be used to indicate the last uplink transmission slot within the channel occupancy time of the base station. Method 2, when applied alone, has an advantage in that, compared with Method 1, a smaller number of bits may be used to indicate the last uplink transmission slot within the channel occupancy time of the base station.

Method 2 will now be described in more detail with reference to Table 9 and FIG. 6.

Referring again to FIG. 6, the base station performs a channel access procedure 650, determines whether or not the unlicensed band is in an idle state, accesses the channel determined to be in an idle state, and transmits/receives up/downlink signals with the terminal for the channel occupancy time 660. In slot n 600, the base station may transmit the channel occupancy time 660 and SFI information regarding slots included in the channel occupancy time 660. After receiving the same, the terminal may acquire the channel occupancy time of the base station and the SIF information regarding slots included in the channel occupancy time. If the terminal has received DCI that schedules reception of the PDSCH 610 in slot n 600, and if the PDSCH-to-HARQ_feedback timing indicator of the DCI indicates "111", the terminal transmits the result of receiving the PDSCH 610, i.e., PDSCH-to-HARQ-ACK feedback 620, through the PUCCH 619 indicated by the PUCCH resource indicator of the DCI in the last uplink transmission slot n+k 603 within the channel occupancy time 660 of the base station. The uplink transmission slot n+k 603 may refer to the last slot among transmission slots that can be used to transmit the PUCCH 619 indicated by the PUCCH resource indicator of the DCI. If transmission of multiple PUCCHs in the slot n+1 603 is configured or instructed, the terminal may select a PUCCH resource to transmit the HARQ-ACK information according to a rule defined in advance with the base station. The selected PUCCH resource may be one of the PUCCH 619 or a configured PUCCH resource. It may also be possible to select a new PUCCH resource.

The terminal may or may not perform a channel access procedure 655 of the terminal before transmitting the PUCCH 619. For example, if the gap between the downlink signal transmission by the base station and the PUCCH 619 transmission is less than or equal to Z us (for example, Z=16 us), the terminal may transmit the PUCCH 619 without performing the channel access procedure 655 (or after performing type 3 channel access procedure). If the gap is greater than Z us (e.g., Z=25 us), the terminal may perform a channel access procedure 655 (e.g., type 2 channel access procedure) and may transmit the PUCCH 619 when it is determined that the channel is idle.

Similarly, if the terminal has received DCI that schedules reception of a PDSCH 611 in slot n+1 601, and if the PDSCH-to-HARQ_feedback timing indicator of the DCI indicated "111", then the terminal may determine that the same is instructed to transmit the result of receiving the PDSCH 611, i.e., PDSCH-to-HARQ-ACK feedback 621, through the last uplink transmission slot n+k 603 within the channel occupancy time 660 of the base station, or through the last slot n+k 603 among the transmission slots that can be used to transmit the PUCCH 619 indicated through the PUCCH resource indicator of the DCI. If the terminal has received DCI that schedules reception of a PDSCH 612 in slot n+2 602, and if the PDSCH-to-HARQ_feedback timing indicator of the DCI indicates "010", then the terminal may transmit the result 622 of receiving the PDSCH 612 through the PUCCH 619 of slot n+k 603 that comes after the slot n+2 602 used to receive the PDSCH 612 by the $3^{rd}$ value provided by dl-DataToUL-ACK.

Method 3: the PDSCH-to-HARQ_feedback timing indicator value that the base station can indicate to the terminal indicates an index regarding a slot including an uplink symbol within the channel occupancy time of the base station.

Method 3:

In Method 3, the base station may use the value of PDSCH-to-HARQ_feedback timing indicator to successively indicate slots indicated as uplink slots among slots included within the channel occupancy time, or slot indices. As used herein, an uplink slot refers to a slot having symbols constituting the slot, at least one of the symbols being indicated as an uplink symbol, or refers to a slot in which a PUCCH resource indicated through a PUCCH or DCI configured for the terminal to transmit the result of receiving a PUSCH exists. A case in which the PDSCH-to-HARQ_feedback timing indicator has a 3-bit size will now be described with reference to Table 10 below.

TABLE 10

| PDSCH-to-HARQ_feedback timing indicator | | | |
|---|---|---|---|
| 1 bit | 2 bit | 3 bit | Slots index k |
| 0 | 00 | 000 | $1^{st}$ UL slot in the indicated COT |
| 1 | 01 | 001 | $2^{nd}$ UL slot in the indicated COT |
|  | 10 | 010 | $3^{rd}$ UL slot in the indicated COT |
|  | 11 | 011 | $4^{th}$ UL slot in the indicated COT |
|  |  | 100 | $5^{th}$ UL slot in the indicated COT |
|  |  | 101 | $6^{th}$ UL slot in the indicated COT |
|  |  | 110 | $7^{th}$ UL slot in the indicated COT |
|  |  | 111 | $8^{th}$ UL slot (or last UL slot) in the indicated COT |

The terminal may receive DCI transmitted through a PDCCH based on a CORESET configured by the base station, and may receive a PDSCH according to information indicated by the received DCI. The terminal may report (or feedback) the result of receiving the PDSCH, i.e., HARQ-ACK information, to the base station through the PUCCH or PUSCH in the slot indicated by the PDSCH-to-HARQ_feedback timing indicator field included in the DCI. For example, if the terminal is scheduled to receive the PDSCH in slot n, the terminal reports the result of receiving the PDSCH to the base station through the PUCCH or PUSCH in the slot k indicated by the PDSCH-to-HARQ feedback timing indicator field included in the PDSCH scheduling DCI, i.e., slot n+k. The PDSCH-to-HARQ_feedback timing indicator value may successively indicate uplink slots included in the channel occupancy time of the base station.

Whether the PDSCH-to-HARQ_feedback timing indicator value (e.g., "111") successively indicates uplink slots included in the channel occupancy time of the base station as in Table 10 or indicates slots successively configured by dl-DataToUL-ACK as in Table 8 (e.g., $8^{th}$ value provided by dl-DataToUL-ACK) may be distinguished through a separate field inside the PUCCH-Config information.

It is also possible to distinguish the indicating value according to the DCI format. For example, when transmitting the result of receiving a PDSCH based on fallback DCI, if the PDSCH-to-HARQ_feedback timing indicator value (e.g., "111") is the $8^{th}$ value provided by di-DataToUL-ACK and, when transmitting the result of receiving a PDSCH based on non-fallback DCI, the PDSCH-to-HARQ_feedback timing indicator value (e.g., "111") may be used to indicate the eighth slot among the uplink slots included in the channel occupancy time of the base station, as in Table 8.

In addition, at least one of the PDSCH-to-HARQ_feedback timing indicator values (e.g., "111") may be used to indicate the $k^{th}$ uplink slot inside the channel occupancy interval of the base station or the last uplink slot inside the channel occupancy interval.

Whether the PDSCH-to-HARQ_feedback timing indicator value (e.g., "111") indicates the $k^{th}$ uplink slot or indicates the last uplink transmission slot within the channel occupancy time of the base station may be distinguished through a separate field inside the PUCCH-Config information. Alternatively, one of values of dl-DataToUL-ACK may indicate the last uplink transmission slot within the channel occupancy time of the base station (e.g., "X" or "last"), or the same may be defined in advance between the base station and the terminal. If the number of uplink slots included in the channel occupancy time of the base station is greater than K, i.e., if the number of uplink slots included in the channel occupancy time of the base station is greater than $2^Y$, which can be indicated by the size of the PDSCH-to-HARQ_feedback timing indicator (Y bits), at least one of the PDSCH-to-HARQ_feedback timing indicator values may be used to indicate the last uplink transmission slot within the channel occupancy time of the base station.

Method 2 and Method 3 may be used together. For example, if the PDSCH-to-HARQ_feedback timing indicator field in Table 10 includes 3 bits, respective 3-bit values of the field may successively indicate uplink slots within the channel occupancy time according to Method 3, and at least one of the PDSCH-to-HARQ_feedback timing indicator values may indicate the last uplink slot within the channel occupancy time according to Method 2.

Method 3 may also be used together with Method 1 described above. For example, the size of the PDSCH-to-HARQ_feedback timing indicator field may be increased, and the PDSCH-to-HARQ_feedback timing indicator value may be used to successively indicate uplink slots within the channel occupancy time of the base station.

Method 2 and Method 3 may also be applied together, as described above, and it is thus possible to implement, as desired, an embodiment in which Method 1, Method 2, and Method 3 are all applied together.

Method 3, when applied alone, has an advantage in that, compared with Method 1 or Method 2, a smaller number of bits may be used to indicate uplink transmission slots included in the channel occupancy time of the base station.

Method 3 will now be described in more detail with reference to Table 10 and FIG. 7.

Figure 7:
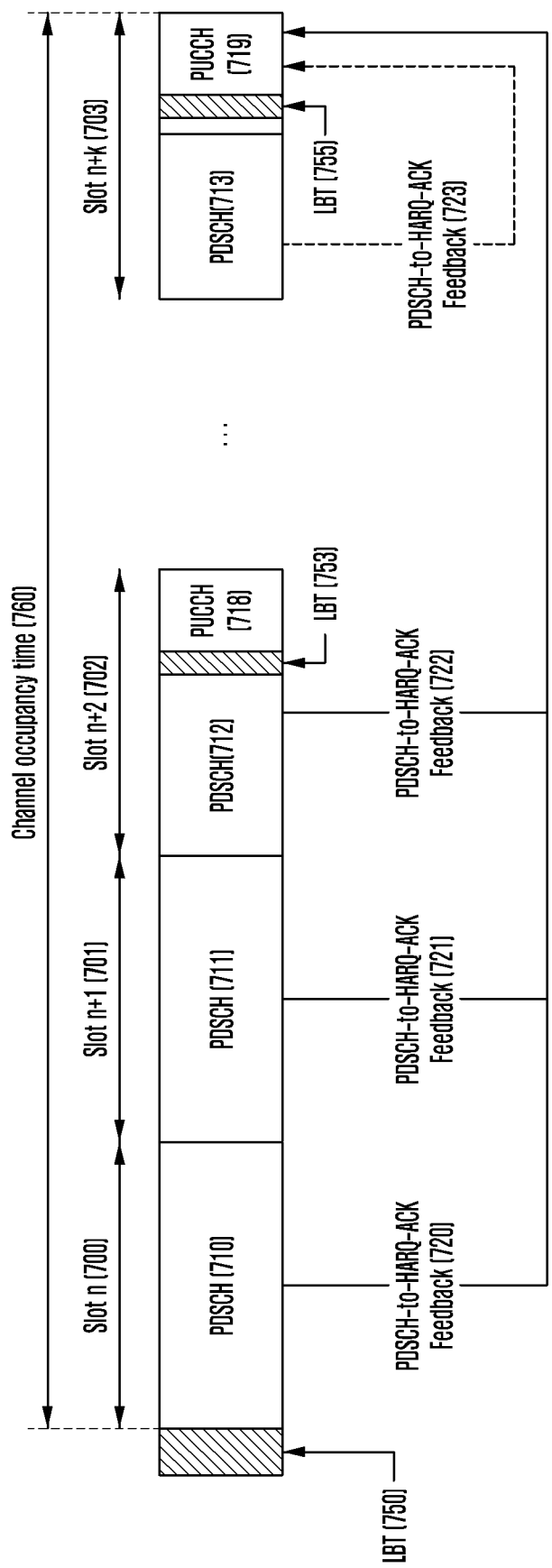
FIG. 7 illustrates a HARQ-ACK feedback method according to an embodiment.

FIG. 7 illustrates a HARQ-ACK feedback method according to an embodiment.

Referring to FIG. 7, the base station performs a channel access procedure 750, determines whether or not the unlicensed band is in an idle state, accesses the channel determined to be in an idle state, and transmits/receives up/downlink signals with the terminal for the channel occupancy time 760. In slot n 700, the base station may transmit the channel occupancy time 760 and SFI information regarding slots included in the channel occupancy time 760.

After receiving the same, the terminal may acquire the channel occupancy time of the base station and the SIF information regarding slots included in the channel occupancy time. If the terminal has received DCI that schedules reception of the PDSCH 710 in slot n 700, and if the PDSCH-to-HARQ_feedback timing indicator of the DCI indicates "000", the terminal transmits the result of receiving the PDSCH 710, that is, PDSCH-to-HARQ-ACK feedback 720, through the PUCCH 718 in the first uplink transmission slot (for example, slot n+2 702) among slots included in the channel occupancy time 760 of the base station. The terminal may also perform LBT 753 before transmitting the PUCCH 718. Similarly, if the terminal has received DCI that schedules reception of the PDSCH 711 in slot n+1 700, and if the PDSCH-to-HARQ_feedback timing indicator of the DCI indicates "111", the terminal may transmit the result of receiving the PDSCH 711, i.e., PDSCH-to-HARQ-ACK feedback 721, through the PUCCH 719 or PUSCH in the eighth uplink transmission slot (e.g., slot n+k 703) or the last uplink transmission slot (e.g., slot n+k 703) among the slots included in the channel occupancy time 760 of the base station.

If transmission of multiple PUCCHs in slot n+2 702 or slot n+k 703 is configured or instructed, the terminal may select a PUCCH resource to transmit the HARQ-ACK information according to a rule defined in advance with the base station. The selected PUCCH resource may be one of the PUCCH 719 or a configured PUCCH resource. It may also be possible to select a new PUCCH resource.

The terminal may or may not perform a channel access procedure 753 or 755 of the terminal before transmitting the PUCCH 718 or 719. For example, if the gap between the downlink signal transmission by the base station and the PUCCH 718 or 719 transmission is less than or equal to Z us (e.g., Z=16 us), the terminal may transmit the PUCCH 718 or 719 without performing the channel access procedure 753 or 755 (or after performing type 3 channel access procedure). However, if the gap is greater than Z us (e.g., Z=25 us), the terminal may perform a channel access procedure 753 or 755 (e.g., a type 2 channel access procedure) and may transmit the PUCCH 718 or 719 when it is determined that the channel is idle.

In connection with various methods described above, the process of the terminal receiving information indicating PDSCH-to-HARQ_feedback timing and then determining the feedback timepoint based on at least one of Table 5, Table 8, Table 9, and Table 10 may be determined according to whether the PUCCH (or the PDSCH) used by the terminal to transmit the HARQ-ACK feedback is a licensed band or an unlicensed band. For example, if the terminal is instructed to transmit the HARQ-ACK feedback through an unlicensed band, the terminal may determine a feedback transmission slot according to at least one of the various tables mentioned above. However, if the terminal is instructed to transmit the HARQ-ACK feedback through a licensed band, the terminal may transmit the HARQ-ACK feedback at a timepoint based on an explicit instruction from the base station.

It is also possible to indicate the HARQ-ACK feedback time by using another method, wherein the base station indicates the HARQ-ACK feedback time to the terminal such that the terminal can transmit the result of receiving a PDSCH within the channel occupancy time of the base station. In addition, although embodiments have been described with regard to a terminal reporting the result of receiving a PDSCH to a base station through a PUCCH, it is also possible to multiplex HARQ-ACK information with a PUSCH and then transmit the same, if the slot configured or instructed to transmit the PUCCH is configured or instructed to transmit the PUSCH. For a terminal capable of transmitting both a PUCCH and a PUSCH through one slot, each of the PUCCH and the PUSCH may be transmitted to transmit the HARQ-ACK information.

Embodiment 2

In accordance with an embodiment, a method is provided, wherein, in connection with a base station and a terminal operating in an unlicensed band, if the terminal has received a PDSCH transmitted within a channel occupancy time during which the base station has accessed the channel through a channel access procedure, and if the terminal cannot transmit the result of receiving the PDSCH within the channel occupancy time, the base station indicates a HARA-ACK feedback time to the terminal, and the terminal transmits a HARQ-ACK.

The terminal may receive DCI transmitted through a PDCCH based on a CORESET configured by the base station, and may receive a PDSCH according to information indicated by the received DCI. The terminal may report (or feedback) the result of receiving the PDSCH, i.e., HARQ-ACK information, to the base station through a PUCCH or PUSCH in a slot indicated by PDSCH-to-HARQ_feedback timing indicator included in the DCI. The value indicated by the PDSCH-to-HARQ_feedback timing indicator may be defined by various methods described herein.

For example, if the terminal is scheduled to receive a PDSCH in slot n, then the terminal reports the result of receiving the PDSCH through a PUCCH or PUSCH in slot k indicated by the PDSCH-to-HARQ_feedback timing indicator field included in the PDSCH scheduling DCI, i.e., slot n+k. The PDSCH-to-HARQ_feedback timing indicator may be configured based on one of Table 5, Table 8, Table 9, and Table 10 described above. If the HARQ-ACK information cannot be transmitted within the channel occupancy time of the base station according to the processing time capability of the terminal, or if the slot n+k instructed to transmit HARQ-ACK information by the base station through the PDSCH-to-HARQ_feedback timing indicator is out of the channel occupancy time of the base station, a HARK-ACK transmission method by the terminal should be performed.

Figure 8:
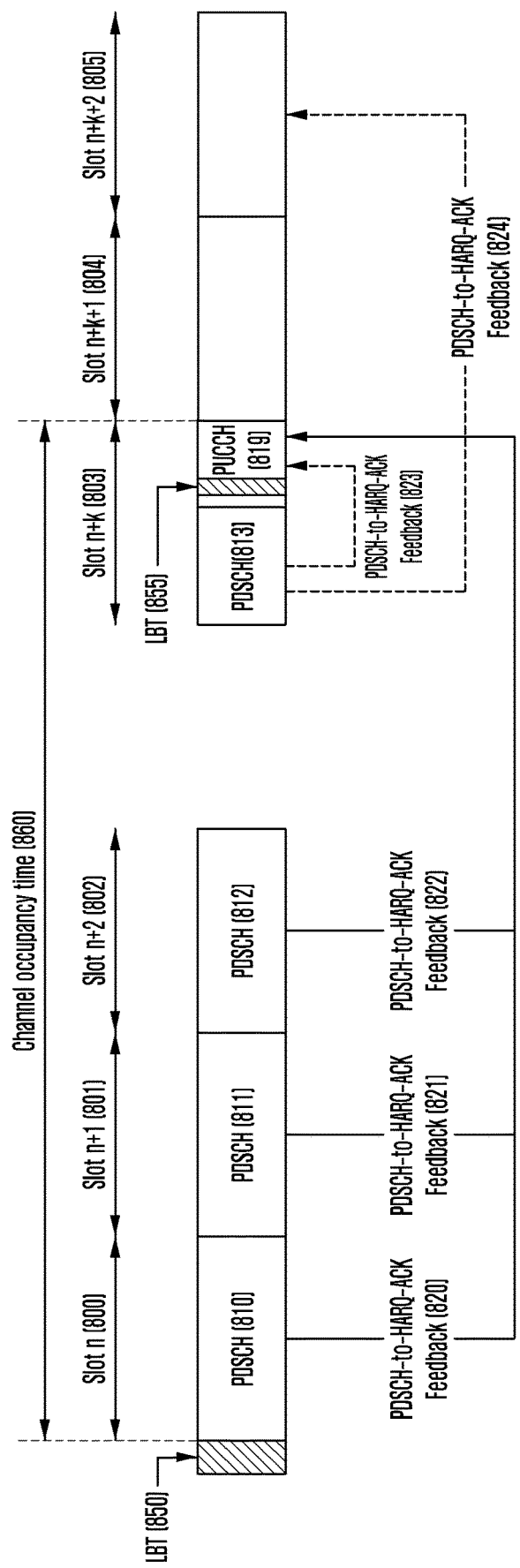
FIG. 8 illustrates a HARQ-ACK feedback method according to an embodiment.

FIG. 8. illustrates a HARQ-ACK feedback method according to an embodiment.

Referring to FIG. 8, the base station performs a channel access procedure 850, determines whether or not the unlicensed band is in an idle state, accesses the channel determined to be in an idle state, and transmits/receives up/downlink signals with the terminal for the channel occupancy time 860. In slot n 800, the base station may transmit the channel occupancy time 860 and SFI information regarding slots included in the channel occupancy time 860.

After receiving the channel occupancy time 860 and SFI information regarding slots included in the channel occupancy time 860, the terminal may acquire the channel occupancy time of the base station and the SIF information regarding slots included in the channel occupancy time. If the terminal has received DCI that schedules reception of the PDSCH 810 in slot n 800, and if the PDSCH-to-HARQ_ feedback timing indicator of the DCI indicates HARQ-ACK information transmission in slot n+k 803, then the terminal transmits the result of receiving the PUSCH 810 (PDSCH-to-HARQ-ACK feedback 820) through the PUCCH 819 indicated through the PUCCH resource indicator of the DCI in slot n+k 803. The terminal may or may not perform a channel access procedure 855 of the terminal before transmitting the PUCCH 819. For example, if the gap between the downlink signal transmission by the base station and the PUCCH 819 transmission is less than or equal to Z us (e.g., Z~16 us), the terminal may transmit the PUCCH 819 without performing the channel access procedure 855 (or after performing a type 3 channel access procedure). If the gap is greater than Z us (e.g., Z=25 us), the terminal may perform a channel access procedure 855 (e.g., a type 2 channel access procedure) and may transmit the PUCCH 819 when it is determined that the channel is idle.

If the terminal has received DCI that schedules reception of the PDSCH 813 in slot n+k 803, if the PDSCH-to-HARQ_feedback timing indicator of the DCI indicates HARQ-ACK information 823 transmission in slot n+k 803, and if the HARQ-ACK information cannot be transmitted in slot n+k 803 according to the processing time capability of the terminal, i.e., according to the minimum time necessary to generate HARQ-ACK information regarding the PDSCH and to transmit the same (e.g., a terminal capable of transmitting a HARQ-ACK after a time corresponding to the length of N1 symbols from the PDSCH reception ending symbol), then the terminal cannot transmit the HARQ-ACK information regarding the PDSCH 813 through the PUCCH 819 indicated through the PUCCH resource indicator of the DCI in slot n+k 803.

The base station has received information regarding the processing time capability of the terminal, including the N1 value of the terminal, from the terminal, and thus is aware of the processing time capability of the terminal. In this case, the base station may instruct HARQ-ACK information transmission 824 in a slot (e.g., slot n+k+2 805) after slot n+k 803 through the PDSCH-to-HARQ_feedback timing indicator of the DCI. However, in slot n+k+2 805, which corresponds to a time outside the channel occupancy time 860 of the base station, the terminal needs to perform a separate channel access procedure (e.g., a type 1 channel access procedure) in order to transmit HARQ-ACK information in slot n+k+2 805. That is, not only does the base station have difficulty in predicting whether or not the terminal can access the channel in slot n+k+2 805, but the base station may perform a channel access procedure in order to access the unlicensed band again (e.g., for a new downlink transmission) after the channel occupancy time 860 is over. The base station may continuously perform a channel access procedure in order to access the channel in slot n+k+1 804, and may compete with the terminal to access the unlicensed band in slot n+k+2 805.

If the terminal ends the channel access procedure before the base station, and thus accesses the unlicensed band, the base station cannot access the unlicensed band. Therefore, the base station should perform a method wherein, if the terminal has received a PDSCH transmitted within a channel occupancy time when the base station has accessed the channel through a channel access procedure, and if the terminal cannot transmit the result of receiving the PDSCH within the channel occupancy time, the base station indicates a HARQ-ACK feedback time to the terminal in one of Methods A to below, and the terminal transmits HARQ-ACK according to such indication.

Method 1: if a PUCCH transmission slot indicated through a PDSCH-to-HARQ_feedback timing indicator indicates a time or slot other than the channel occupancy time of the base station that has received a PDSCH, the terminal does not perform HARQ-ACK transmission regarding the PDSCH.

Method 1;

In Method 1, if the terminal has received DCI that schedules reception of a PDSCH 813 in slot n+k 803, and if the PUCCH transmission slot instructed to transmit a HARQ-ACK feedback 823 through the PDSCH-to-HARQ_ feedback timing indicator value of the DCI is a slot after the channel occupancy time 860 of the base station, then the terminal may determine not to transmit HARQ-ACK information regarding the PDSCH 813, and may not transmit HARQ-ACK information. If PDSCH reception and HARQ-ACK transmission related thereto do not occur or cannot occur within the same channel occupancy time, or if the channel occupancy time of the base station, including a PDSCH reception slot, and the base station channel occupancy time of the HARQ-ACK transmission slot related thereto are different from each other, the terminal may determine not to transmit HARQ-ACK information regarding the PDSCH 813, and may not transmit HARQ-ACK information. In this case, the base station may not expect the terminal to transmit HARQ-ACK information regarding the corresponding PDSCH 813.

Method 2: at least one value of PDSCH-to-HARQ_feedback timing indicator field is used when the base station does not indicate HARQ-ACK transmission timing.

Method 2:

In Method 2, if the terminal has received a PDSCH transmitted within a channel occupancy time when the base station has accessed the channel through a channel access procedure, and if the terminal cannot transmit the result of receiving the PDSCH, i.e., HARQ-ACK information, within the channel occupancy time, the base station may explicitly instruct the terminal not to transmit the HARQ-ACK information by using at least one value of PDSCH-to-HARQ_feedback timing indicator field (e.g., the first or last entry).

Referring to FIG. 8 and Table 11 below, if the terminal has received DCI that schedules reception of a PDSCH 813 in slot n 803, and if the PDSCH-to-HARQ_feedback timing indicator value of the DCI is "000", the terminal may determine not to transmit HARQ-ACK information 823 regarding the PDSCH 813 and may not transmit HARQ-ACK information. However, if the terminal has received DCI that schedules reception of a PDSCH 813 in slot n 803, if the PDSCH-to-HARQ_feedback timing indicator value of the DCI is "111", and if the PDSCH-to-HARQ_feedback timing indicator value "111" is the $8^{th}$ value provided by dl-DataToUL-ACK (e.g., the $8^{th}$ value=2) as in Table 5, then the terminal transmits the HARQ-ACK information through the PUCCH indicated through the PUCCH resource indicator of the DCI in slot n+k+2 805.

Although a method has been described wherein at least one value of PDSCH-to-HARQ_feedback timing indicators of DCI is used not to indicate HARQ-ACK transmission timing to the terminal, or to instruct the terminal not to perform HARQ-ACK transmission as in Method B above, it is also possible to instruct the terminal not to perform HARQ-ACK transmission by using one or multiple fields other than the PDSCH-to-HARQ_feedback timing indicator among fields or information included in the DCI. It is also possible to add a new field, e.g., a HARQ-ACK transmission indicator field, to the DCI, thereby instructing the terminal to perform HARQ-ACK transmission (e.g., HARQ-ACK transmission indicator=1) or not to perform HARQ-ACK transmission (e.g., HARQ-ACK transmission indicator=0).

TABLE 11

| PDSCH-to-HARQ_feedback timing indicator | | | |
|---|---|---|---|
| 1 bit | 2 bit | 3 bit | Slots index k |
| 0 | 00 | 000 | Not available |
| 1 | 01 | 001 | $2^{nd}$ UL slot in the indicated COT |
|  | 10 | 010 | $3^{rd}$ UL slot in the indicated COT |
|  | 11 | 011 | $4^{th}$ UL slot in the indicated COT |
|  |  | 100 | $5^{th}$ UL slot in the indicated COT |
|  |  | 101 | $6^{th}$ UL slot in the indicated COT |
|  |  | 110 | $7^{th}$ UL slot in the indicated COT |
|  |  | 111 | $8^{th}$ UL slot (or last UL slot) in the indicated COT |

Method 3: the value indicated by the PDSCH-to-HARQ_feedback timing indicator field indicates an uplink transmission slot within a base station channel occupancy time immediately after a base channel occupancy time including a PDSCH reception slot Method 3 will now be described in more detail with reference to FIG. 9 and Table 10.

Figure 9:
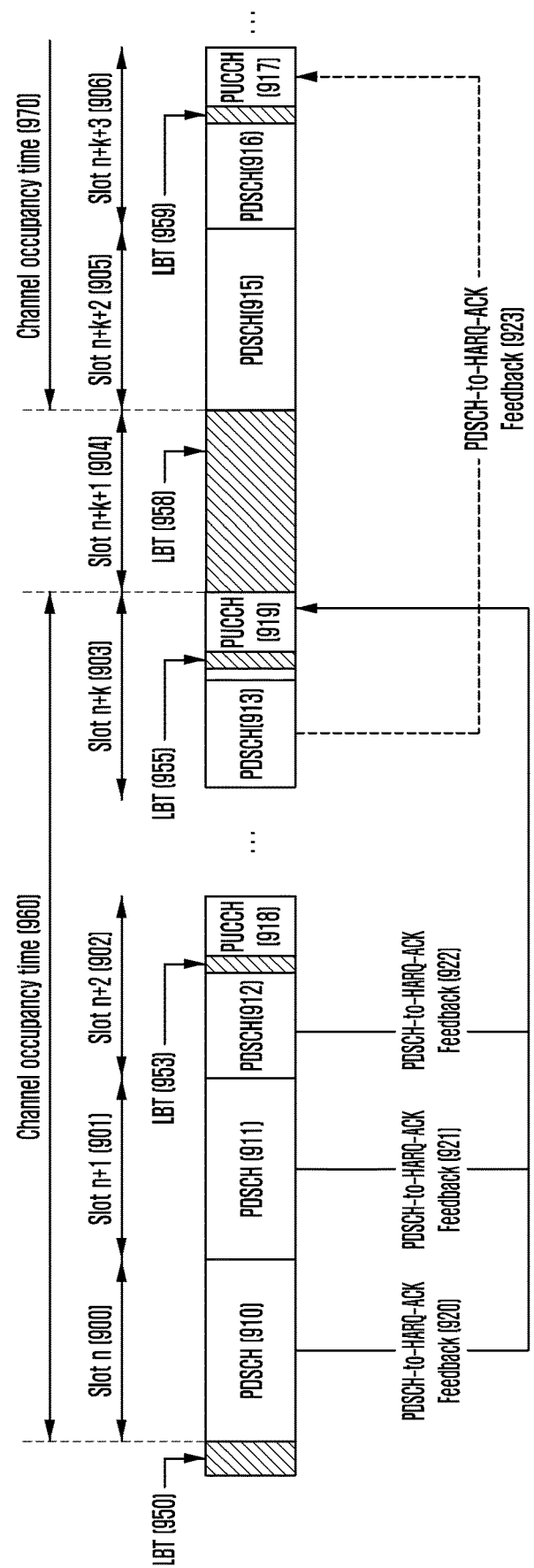
FIG. 9 illustrates a HARQ-ACK feedback method according to an embodiment.

FIG. 9 illustrates a HARQ-ACK feedback method according to an embodiment.

Referring to FIG. 9, the base station performs a channel access procedure 950, determines whether or not the unlicensed band is in an idle state, accesses the channel determined to be in an idle state, and transmits/receives up/downlink signals with the terminal for the channel occupancy time 960. In slot n 900, the base station may transmit the channel occupancy time 960 and SFI information regarding slots included in the channel occupancy time 960. After receiving the same, the terminal may acquire the channel occupancy time of the base station and the SIF information regarding slots included in the channel occupancy time. If the terminal has received DCI that schedules reception of a PDSCH 910 in slot n 900, and if the PDSCH-to-HARQ_feedback timing indicator of the DCI indicates "000" in Table 10, then the terminal may transmit the result 920 of receiving the PDSCH 910 through the PUCCH 918 in the first uplink transmission slot (e.g., slot n+2 902) among slots included in the channel occupancy time 960 of the base station. Similarly, if the terminal has received DCI that schedules reception of a PDSCH 911 in slot n+1 901, and if the PDSCH-to-HARQ_feedback timing indicator of the DCI indicates "111" in Table 8, then the terminal may transmit the result 921 of receiving the PDSCH 911 through the PUCCH 919 or PUSCH in the eighth uplink transmission slot (e.g., slot n+k 903) or the last uplink transmission slot (e.g., slot n+k 903) among the slots included in the channel occupancy time 960 of the base station. If transmission of multiple PUCCHs in slot n+2 902 or slot n+k 903 is configured or instructed, the terminal may select a PUCCH resource to transmit the HARQ-ACK information according to a rule defined in advance with the base station. The selected PUCCH resource may be one of the PUCCH 919 or a configured PUCCH resource. It may also be possible to select a new PUCCH resource.

The terminal may or may not perform a channel access procedure 953 or 955 of the terminal before transmitting the PUCCH 918 or 919. For example, if the gap between the downlink signal transmission by the base station and the PUCCH 918 or 919 transmission is less than or equal to Z us (e.g., Z=16 us), the terminal may transmit the PUCCH 918 or 919 without performing the channel access procedure 953 or 955 (or after performing a type 3 channel access procedure). If the gap is greater than Z us (e.g., Z=25 us), the terminal may perform a channel access procedure 953 or 955 (e.g., a type 2 channel access procedure) and may transmit the PUCCH 918 or 919 when it is determined that the channel is idle.

A case will now be described in which the terminal has received DCI that schedules reception of a PDSCH 913 in slot n+k 903, and the PUCCH transmission slot indicated through the PDSCH-to-HARQ_feedback timing indicator value of the DCI is a slot after the channel occupancy time 960 of the base station. For example, it is possible to consider a case in which the number of uplink slots indicated by the PDSCH-to-HARQ_feedback timing indicator is greater than the number of uplink transmission slots included in the channel occupancy time 960, or an uplink transmission slot after the same is indicated (e.g., there are a total of two uplink slots within the channel occupancy time 960 in FIG. 9, but the PDSCH-to-HARQ_feedback timing indicator in Table 10 indicates the third uplink slot or the like).

It is also possible to consider a case in which the HARQ-ACK transmission cannot be performed in the uplink slot indicated by the PDSCH-to-HARQ_feedback timing indicator, according to the processing time capability of the terminal (e.g., although transmission of a HARQ-ACK regarding the PDSCH 913 through PUCCH 911 is instructed, PDSCH-to-HARQ_feedback timing indicator=001, and HARQ-ACK information regarding the PDSCH 913 cannot be transmitted through the PUCCH 919 according to the processing time capability of the terminal).

The terminal may determine that the uplink slot indicated by the PDSCH-to-HARQ_feedback timing indicator corresponds to an uplink slot in a time 970 when the base station occupies the channel again for the first time after the current channel occupancy time 960 of the base station. For example, if the terminal receives an indication that, in connection with the HARQ-ACK regarding the PDSCH 913 in FIG. 9, PDSCH-to-HARQ_feedback timing indicator=010, the terminal compares the uplink slot included in the channel occupancy time 960 of the base station including the slot used to receive the PDSCH 913 with the uplink slot indicated by the PDSCH-to-HARQ_feedback timing indicator. In the example described above, the channel occupancy time 960 of the base station includes two uplink slots, but the PDSCH-to-HARQ_feedback timing indicator indicates the third uplink slot. Accordingly, the terminal may transmit HARQ-ACK information regarding the PDSCH 913 through the first slot among the uplink slots included in the next channel occupancy time 970 of the base station. The example above in which HARQ-ACK information regarding the PDSCH 913 is transmitted through the first slot among the uplink slots included in the next channel occupancy time 970 of the base station corresponds to a case in which the uplink slot indicated by the PDSCH-to-HARQ_feedback timing indicator is counted from the uplink slots in the current channel occupancy time 960. The terminal may determine the HARQ-ACK transmission slot in the new channel occupancy time 970 by using the number (or index) obtained by subtracting uplink transmission slots included in the previous channel occupancy time 960 from the uplink slots indicated by the PDSCH-to-HARQ_feedback timing indicator. The PDSCH-to-HARQ_feedback timing indicator may also indicate the index related to an uplink slot included in the next channel occupancy time 970 of the base station. That is, the terminal may perform HARQ-ACK transmission in the third slot among the uplink slots included in the channel occupancy time 970.

Alternatively, if the terminal has determined that the uplink slot indicated by the PDSCH-to-HARQ_feedback timing indicator corresponds to an uplink slot in a time 970 when the base station occupies the channel again for the first time after the current channel occupancy time 960 of the base station, then the terminal may transmit HARQ-ACK information through the first slot in the new channel occupancy time 970 regardless of the value indicated by the PDSCH-to-HARQ_feedback timing indicator.

If the terminal transmits at least one piece of HARQ-ACK information through a PUCCH based on a HARQ-ACK codebook having a fixed size (or semi-static HARQ-ACK codebook) or a HARQ-ACK codebook having a variable size (or dynamic HARQ-ACK codebook), and if the codebook includes HARQ-ACK information regarding the PDSCH, then the terminal may consider that the HARQ-ACK is "NACK", without a process of decoding the PDSCH, and may transmit the codebook accordingly. In this case, the HARQ-ACK information may not be used for the channel access procedure because NACK has been assumed without an actual PDSCH decoding process.

Embodiment 3

In accordance with an embodiment, a method is provided, wherein, if the base station has not indicated HARQ-ACK transmission timing to the terminal, HARQ-ACK information regarding a PDSCH is transmitted with no indication of the transmission timing of the terminal.

The terminal may receive DCI transmitted through a PDCCH based on a CORESET configured by the base station, and may receive a PDSCH according to information indicated by the received DCI. The terminal may report (or feedback) the result of receiving the PDSCH, i.e., HARQ-ACK information, to the base station through a PUCCH or PUSCH in a slot or symbol indicated by PDSCH-to-HARQ_feedback timing indicator included in the DCI.

A definition may be made in advance between the base station or the terminal, or a configuration may be made through an upper-level signal such that the PDSCH-to-HARQ_feedback timing indicator field, or at least one value among values indicated by the field, or the inherent meaning thereof does not indicate HARQ-ACK transmission timing. If the terminal has received DCI that schedules PDSCH reception, and if the terminal determines that HARQ-ACK transmission timing is not indicated through the PDSCH-to-HARQ_feedback timing indicator included in the DCI, then the terminal may not report the result of receiving the PDSCH to the base station. That is, the base station may instruct the terminal not to transmit the HARQ-ACK through the PDSCH-to-HARQ_feedback timing indicator field, or at least one value among values indicated by the field, or the inherent meaning thereof.

Thereafter, the base station may request the terminal to report the HARQ-ACK information, which has not been reported, through an additional HARQ-ACK report request, and the terminal may report HARQ-ACK information, including at least one piece of unreported HARQ-ACK information, to the base station according to the request of the base station. The terminal cannot store the unreported HARQ-ACK information for an indefinite period of time, and thus should determine the expiration time of the unreported HARQ-ACK information and delete or discard HARQ-ACK information that has expired. To this end, a timer may be used.

Although it is assumed herein that the terminal receives and decodes a PDSCH and does not report the result of receiving the PDSCH to the base station, the same is also applicable when the terminal receives a PDSCH and does not decode the PDSCH. The terminal may acquire the result of receiving the PDSCH by decoding the PDSCH before reporting the result of receiving the PDSCH. In this case, the timer provided in this embodiment may be able to determine the expiration time of the PDSCH having no reported HARQ-ACK information.

For example, if the terminal has received DCI that indicates PDSCH reception, and if the PDSCH-to-HARQ_feedback timing indicator of DCI does not indicate the HARQ-ACK transmission timing regarding the PDSCH, then the terminal may start or restart the timer. The time at which the timer is started or restarted may correspond to one of the symbols used to receive the DCI (e.g., the first or last symbol of DCI) or a slot, or may correspond to the PDSCH receiving symbol indicated by the DCI (e.g., the first or last symbol of PDSCH) or a slot. If the terminal is not instructed or requested to report the result of receiving the PDSCH until the timer expires, the terminal may delete or discard the result of receiving the PDSCH. If the terminal is instructed or requested to report the result of receiving the PDSCH before the timer expires, the terminal may initialize the timer.

More specifically, the terminal may receive a configuration of a timer (e.g., a Valid-HARQ-ACK-Timer) for determining the expiration time regarding HARQ-ACK information, the base station having instructed not to report the same, or HARQ-ACK information, which has no indicated HARQ-ACK transmission timepoint, through an upper-level signal including system information from the base station. The timer may include at least one slot unit (e.g., Valid-HARQ-ACK-Timer ENUMERATED {10, 20, 40, 60, 80, 100, 150, 200} wherein 10 refers to ten slots) or ms time unit (e.g., Valid-HARQ-ACK-Timer ENUMERATED {ms10, ms20, ms40, ms60, ms80, ms100, ms150, ms200} wherein 10 ms refers to 10 ms), and one of the above values may be configured for the terminal. The terminal may receive a configuration of the timer value through an information element (IE) of one of upper-level signals (e.g., a Valid-HARQ-ACK-Timer within PUCCH-Config) or through an independent upper-level signal IE.

One timer or multiple timers may be configured for the terminal, and one timer may be configured at least for each cell or each bandwidth part. In addition, a timer may be configured for the terminal with regard to each downlink HARQ process number configured between the base station and the terminal. The timer value configured for each HARQ process may be independent. In addition, a smaller number of timers than the downlink HARQ process number configured between the base station and the terminal may be configured for the terminal. One or more HARQ processes may be regarded as a group, and a timer may be configured for each group. For example, 16 configured HARQ processes may be divided into three groups in the ascending order, and timers may be configured therefor. HARQ processes #0, #1, #2, #3, and #4 may be classified into a first group, HARQ processes #5, #6, #7, #8, and #9 may be classified into a second group, HARQ processes #10, #11, #12, #13, #14, and #15 may be classified into a third group, and timers may be configured for respective groups. This grouping method is only an example, and is not limiting in any manner. A case in which there is one timer group is equal to a case in which all HARQ processes are included in one group. This is also the same as when one timer is configured for each terminal.

It is assumed herein, for convenience of description, that the HARQ process of a PDSCH which has no HARQ-ACK transmission timing indicated through the PDSCH-to-HARQ_feedback timing indicator or the value thereof, or of a PDSCH which is instructed not to perform HARQ-ACK reporting, will be referred to as X. In addition, a timer may refer to a timer configured for a HARQ process X, or a timer configured for a group including a HARQ process X.

If the terminal has a timer configured therefor as above, if the terminal receives DCI that indicates PDSCH reception, and if the PDSCH-to-HARQ_feedback timing indicator of the DCI does not indicate HARQ-ACK transmission timing regarding the PDSCH, then the terminal may start or restart the timer.

The time or timepoint at which the timer is started or restarted corresponds to a case in which at least one of the following cases is satisfied:

one of symbols used to receive the DCI (e.g., the first or last symbol of DCI) or a slot, the PDSCH reception symbol indicated by the DCI (e.g., the first or last symbol of the PDSCH), or a slot, the last symbol of the COT of the base station including the symbol used to receive the DCI, or a symbol after the last symbol, the last symbol of the COT of the base station including the symbol used to receive the DCI, or a symbol immediately after the last symbol (or the first symbol of the slot), or when it is determined that the PDSCH-to-HARQ_feedback timing indicator of DCI received from a MAC entity does not indicate HARQ-ACK transmission timing regarding the PDSCH.

If the timer is running (e.g., if the HARQ process X or the timer corresponding thereto is running), if the base station has not instructed or requested the terminal to report the result of receiving the PDSCH until the timer has expired, of if the terminal has failed to report the result of receiving the PDSCH, then the terminal may delete or discard the result of receiving the PDSCH. The terminal may fail to report the result of receiving the PDSCH when, although the base station has instructed or requested the terminal to report the result of receiving the PDSCH through an unlicensed band cell or bandwidth part, the terminal has failed to channel-access the unlicensed band cell or bandwidth part. In such a case, the terminal may stop the timer.

In addition, when a terminal is configured to report HARQ-ACK information, including the result of receiving the PDSCH, through the unlicensed band cell or bandwidth part, the terminal may stop the timer in a slot (or symbol) indicated as a downlink transmission slot (or symbol) by an SFI or the like transmitted through a downlink control channel within the channel access interval of the base station, and the terminal may restart the timer in a slot (or symbol) other than a downlink transmission slot (or symbol), e.g., at least one slot (or symbol) of an uplink transmission slot (or symbol) or a flexible slot (or symbol) or a slot (or symbol) that has received no indication of the structure regarding the transmission slot from the base station.

If the timer is running (e.g., if the HARQ process X or the timer corresponding thereto is running), if the base station has instructed or requested the terminal to report the result of receiving the PDSCH before the timer expires, of if the terminal has reported the result of receiving the PDSCH, the terminal may stop the timer. As another example, if the timer is running, and if the terminal has received DCI that instructs PDSCH reception regarding HARQ process X from the base station, then the terminal may stop the timer. The terminal may delete or discard the result of receiving the PDSCH.

Embodiment 4

In accordance with an embodiment, a method is provided, wherein, if the base station has not indicated HARQ-ACK transmission timing to the terminal, HARQ-ACK information regarding a PDSCH is transmitted with no indication of the transmission timing.

The terminal may receive DCI transmitted through a PDCCH based on a CORESET configured by the base station, and may receive a PDSCH according to information indicated by the received DCI. The terminal may report (or feedback) the result of receiving the PDSCH, i.e., HARQ-ACK information, to the base station through a PUCCH or PUSCH in a slot or symbol indicated by PDSCH-to-HARQ_feedback timing indicator included in the DCI.

A definition may be made in advance between the base station or the terminal, or a configuration may be made through an upper-level signal such that the PDSCH-to-HARQ_feedback timing indicator field, or at least one value among values indicated by the field, or the inherent meaning thereof does not indicate HARQ-ACK transmission timing. If the terminal has received DCI that schedules PDSCH reception, and if the terminal determines that HARQ-ACK transmission timing is not indicated through the PDSCH-to-HARQ_feedback timing indicator included in the DCI, then the terminal may not report the result of receiving the PDSCH to the base station. The base station may instruct the terminal not to transmit the HARQ-ACK through the PDSCH-to-HARQ_feedback timing indicator field, or at least one value among values indicated by the field, or the inherent meaning thereof.

Thereafter, the base station may request reporting of the unreported HARQ-ACK information without additional PDSCH scheduling such that the frequency resource can be used more efficiently. Accordingly, the terminal should perform a method for reporting the result of receiving an already received PDSCH to the base station without additionally receiving the PDSCH.

For a terminal transmitting HARQ-ACK information through an unlicensed band, the terminal may need to perform a channel access procedure regarding the unlicensed band before or immediately before the configured or indicated HARQ-ACK transmission starting timepoint. The terminal may transmit the configured uplink only if it is determined through the channel access procedure that the unlicensed band is in an idle state. That is, if it is determined, through the channel access procedure, that the unlicensed band is not in an idle state, the terminal cannot transmit the HARQ-ACK information, and the base station should perform a method for instructing the terminal to report the unreported HARQ-ACK information without additionally receiving the PDSCH.

To this end, the base station may configure the terminal to transmit, through an uplink control channel (e.g., a PUCCH), the result of receiving at least one PDSCH through a PDCCH that configures downlink data reception (or PDSCH reception) or DL grant or DCI format (hereinafter, referred to as DCI).

If the terminal adds and transmits the result of receiving the PDSCH through the PUCCH, the base station can correctly receive the result of receiving the PDSCH, which is transmitted through the PUCCH, only if the base station knows the size of the result of receiving the PDSCH transmitted by the terminal, or the number of bits thereof. The base station and the terminal should know the same value in connection with the size of the result of receiving the PDSCH, or the number of bits thereof, or the number of results of receiving the PDSCH transmitted by the terminal.

Method 4-1: The base station may add, to the DCI, an indicator that indicates the number of PDSCH receiving results that the terminal needs to deliver to the base station, for example, downlink assignment index (DAI) field.

The DAI may at least include information expressing the total number of PDSCH receiving results that the terminal needs to transmit to the base station (or total DAI). One DAI value may express the total number of PDSCH receiving results that the terminal should transmit to the base station or the total number of PDSCH receiving results that the terminal should transmit to the base station or a set of the total numbers. For example, DAI value 0 (or 00) may express one value among the set of the total number of PDSCH receiving results that the terminal should transmit to the base station {1, 5, 9, 13, 17, 21, 25, 29}. The terminal may determine that a value greater than or equal to the number of PDSCHs received before DCI including the DAI value is received is the total number of PDSCH receiving results that the base station has instructed the terminal to transmit. The base station may indicate PDSCH receiving results that should be received from the terminal by using the DAI value transmitted to the terminal, and the terminal may determine the number of PDSCH receiving results that the terminal should transmit to the base station through the received number of PDSCHs and the received DAI value.

Method 4-2: The base station uses a one-bit identifier (identifier for DCI formats) for the DCI so as to distinguish whether the DCI instructs or schedules PDSCH reception (e.g., if identifier value is 1) or the DCI instructs the terminal to report at least one PDSCH receiving result to the base station without receiving PDSCHs (e.g., if identifier value is 0).

In the case of DCI instructing the terminal to report at least one PDSCH receiving result to the base station without receiving PDSCHs, the DCI may include HARQ process information of the PDSCHs that the terminal needs to report. It may also be possible to use different RNTIs to distinguish whether the DCI instructs or schedules PDSCH reception (e.g., C-RNTI is used) or the DCI instructs the terminal to report at least one PDSCH receiving result to the base station without receiving PDSCHs (e.g., new RNTI, H-RNTI, or HARQ-RNTI is used).

More specifically, if the DCI format identifier of received DCI is 0, i.e., if the DCI instructs the terminal to report at least one PDSCH receiving result to the base station without receiving PDSCHs, the DCI may include bitmap information configured with a size at least corresponding to the number of HARQ processes configured between the base station and the terminal. For example, if 16 HARQ processes are configured between the base station and the terminal, and if no spatial multiplexing technique is configured for downlink transmission, then the DCI includes a field including at least 16 bit strings, e.g., HARQ-ACK report request field, and each bit of the field expresses whether or not a HARQ-ACK report is requested for one HARQ process. The most significant bit (MSB) of the field may be configured as a HARQ-ACK report request field regarding the HARQ process in the ascending order from the HARQ process having the smallest index (for example, HARQ process #0) among configured HARQ processes. The least significant bit (LSB) of the field is HARQ process #15. If 16 HARQ processes are configured between the base station and the terminal, and if the spatial multiplexing technique is configured for downlink transmission, then the HARQ-ACK report request field may include 32 bit strings. Each two-bit unit of the field may express whether or not one HARQ-ACK report is requested with regard to two transport blocks transmitted through one HARQ process. The MSB of the field may be configured as a HARQ-ACK report request field regarding the HARQ process in the ascending order from the HARQ process having the smallest index (e.g., HARQ process #0) among configured HARQ processes. That is, the LSB of the field is HARQ process #15.

If the spatial multiplexing technique is configured for downlink transmission, then the HARQ-ACK report request field may include 16 bit strings. Each one bit of the field may request or may not request that all HARQ-ACK information results regarding two transport blocks transmitted through one HARQ process be reported together.

The DCI may include at least a PDSCH-to-HARQ_feedback timing indicator field and a PUCCH resource indicator field. By using a PUCCH transmission resource determined through the information, the terminal may report, to the base station, the result of receiving at least one HARQ process, reporting of which has been requested by the base station.

Figure 10:
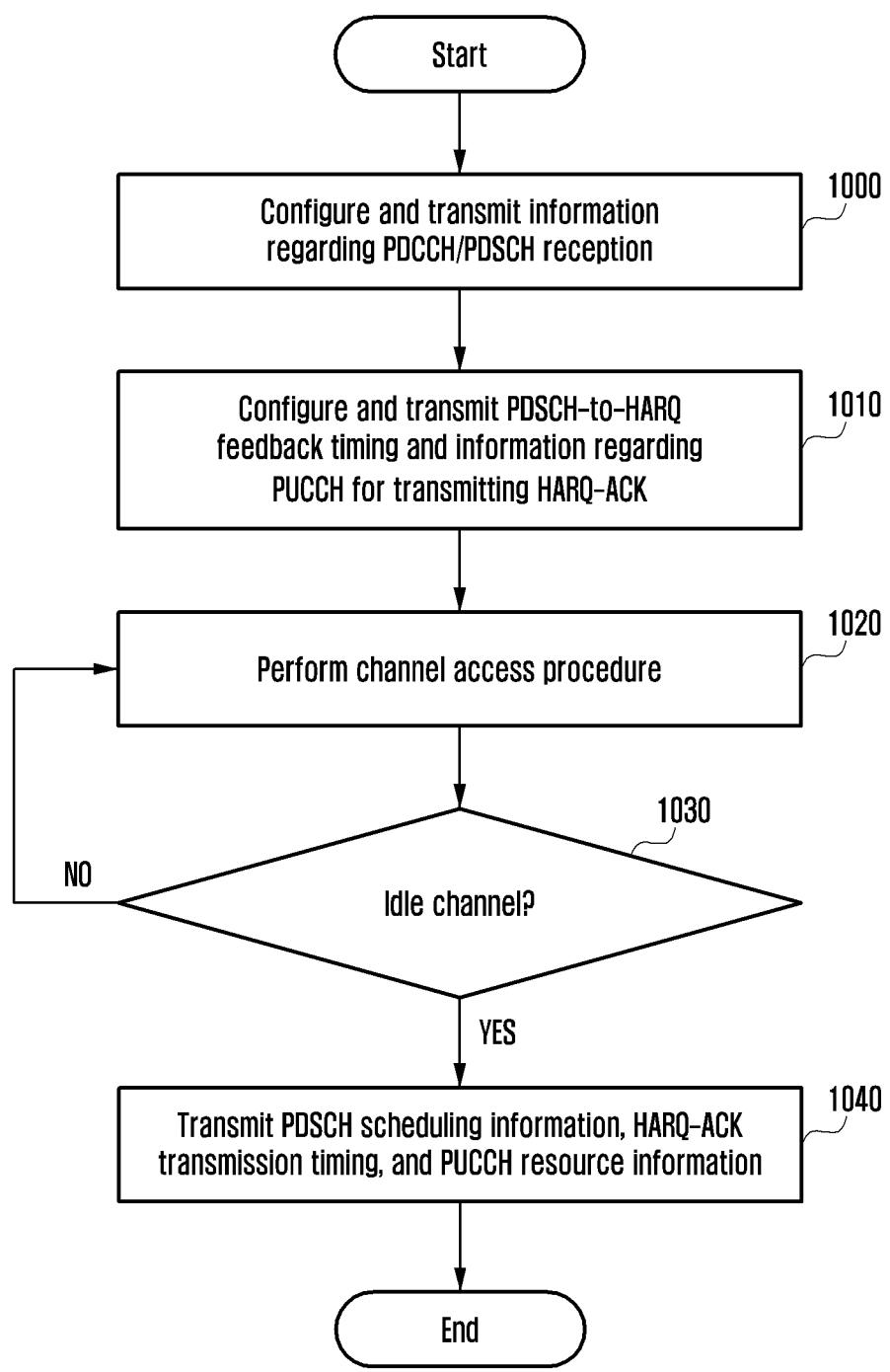
FIG. 10 is a flowchart illustrating operations of a base station according to an embodiment.

FIG. 10 is a flowchart illustrating operations of a base station according to an embodiment.

Referring to FIG. 10, in step 1000, the base station may transmit uplink/downlink signal transmission/reception configuration information, including a configuration regarding PDCCH, PDSCH, and PUSCH transmission/reception, to the terminal through an upper-level signal. For example, the base station may transmit a PDCCH resource domain for receiving downlink or uplink scheduling information, a CORESET configuration, a search space configuration, etc., to the terminal through an upper-level signal. In addition, the base station may transmit configurations regarding downlink and uplink signal transmission/reception, including information regarding offset between a PDCCH reception slot and a PDSCH reception slot or a PDSCH transmission slot, information regarding the number of repeated transmission of the PDSCH or PUSCH, grant-free PUSCH transmission, SRS transmission, etc., to the terminal through an upper-level signal or an SIB.

In step 1010, the base station configures a PUCCH transmission time for which the terminal receives a PDSCH and transmits the result of receiving the PDSCH (HARQ-ACK information), e.g., a dl-DataToUL-ACK value and PDSCH-to-HARQ_feedback timing indicator value, and parameter configuration information necessary for PUCCH transmission including at least one of the PUCCH transmission time and a frequency resource, and may transmit the same to the terminal through an upper-level signal or SIB.

When a base station that wants to transmit signals through an unlicensed band, the base station may perform a channel access procedure with regard to the unlicensed band in step 1020, thereby determining whether or not the unlicensed band is in an idle state.

If it is determined in step 1030 that the unlicensed band is not in an idle state, the base station may continue or resume the channel access procedure with regard to the unlicensed band in step 1020.

If it is determined in step 1030 that the unlicensed band is in an idle state, the base station transmits a PDSCH in step 1040 and may indicate PDSCH-to-HARQ_feedback timing and PUCCH resources, which are determined through various embodiments, through DCI, thereby instructing the terminal to report the result of receiving the PDSCH to the base station.

Figure 11:
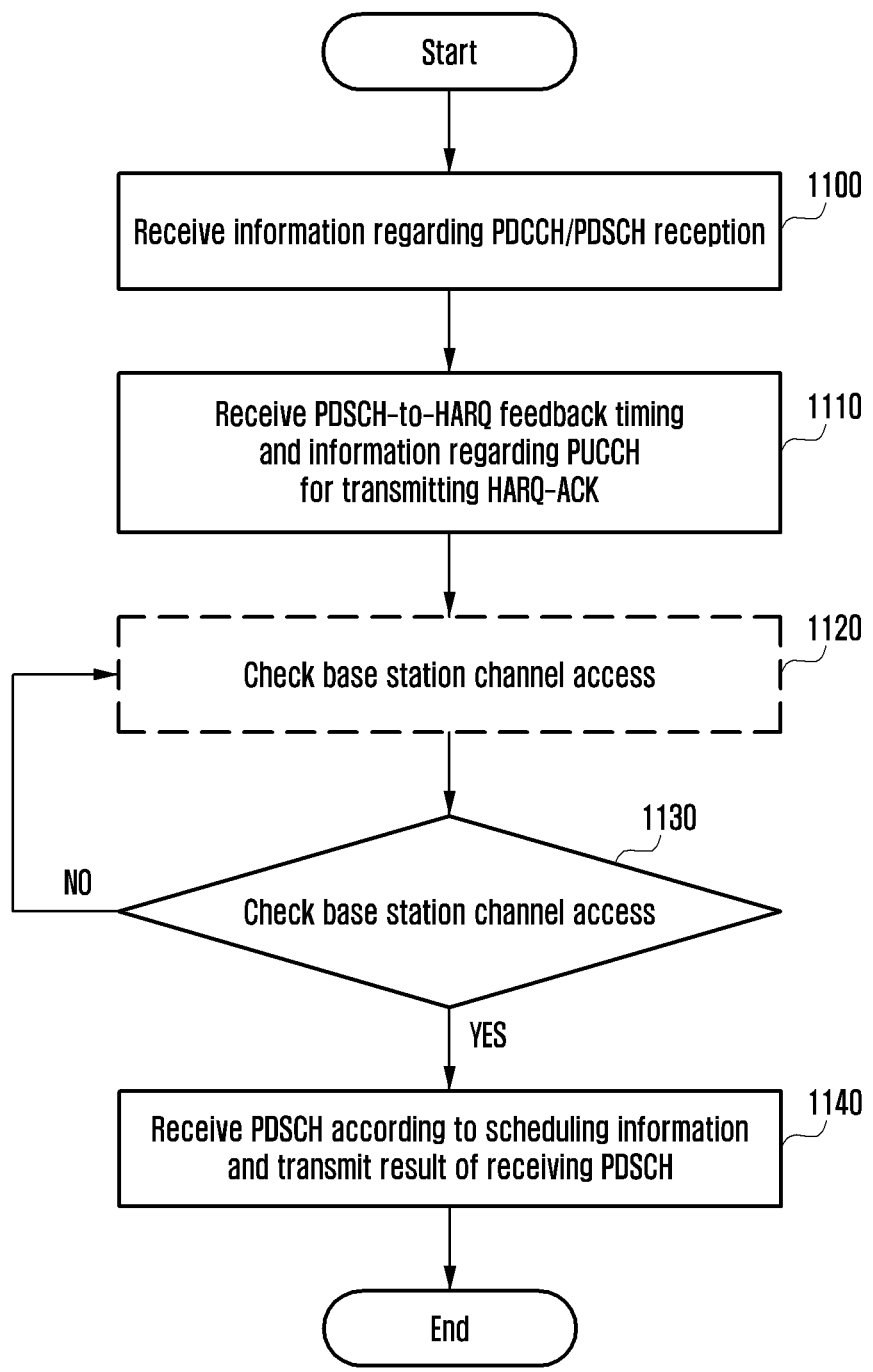
FIG. 11 is a flowchart illustrating operations of a terminal according to an embodiment.

FIG. 11 is a flowchart illustrating operations of a terminal according to an embodiment.

Referring to FIG. 11, in step 1100, the terminal receives a configuration regarding PDCCH, PDSCH, and PUSCH transmission/reception from the base station through an upper-level signal, and receives configuration information regarding downlink and uplink signal transmission, including the configuration regarding PDCCH, PDSCH, and PUSCH transmission/reception, according to the received configuration information. For example, the terminal may receive a PDCCH resource domain for receiving downlink or uplink scheduling information, a CORESET configuration, a search space configuration, etc., from the base station, through an upper-level signal. In addition, the terminal may receive configurations regarding downlink and uplink signal transmission/reception, including information regarding offset between a PDCCH reception slot and a PDSCH reception slot or a PDSCH transmission slot, information regarding the number of repeated transmission of the PDSCH or PUSCH, grant-free PUSCH transmission, SRS transmission, etc., from the base station, through an upper-level signal.

In step 1110, the terminal receives configuration information regarding a PUCCH transmission time at which the result of receiving a PDSCH from the base station (HARQ-ACK information), e.g., a dl-DataToUL-ACK value and PDSCH-to-HARQ_feedback timing indicator value, and parameter configuration information for PUCCH transmission including at least one of the PUCCH transmission time and a frequency resource.

The terminal may receive additional configuration information related to a slot format indicator, such as slot format indicator information and a slot format indicator transmission period, in step 1100 or step 1110, and may determine the channel occupancy time of the base station by using the slot format indicator information.

The terminal may receive slot format indicator information, channel occupancy time information, etc., and in step 1120, confirms whether or not the base station has accessed the channel and whether or not the base station has occupied the channel.

Receiving the information and determining whether or not the base station has accessed the channel is only an example, and the terminal may also determine whether or not the base station has accessed the channel by detecting or receiving a specific signal transmitted by the base station, e.g., a preamble, a synchronization signal, a demodulation reference signal (DMRS), a CSI-RS, etc. Alternatively, the process of determining whether or not the base station has accessed the channel in step 1120 may be omitted.

If the terminal has received DCI transmitted from the base station through the PDCCH and has received a PDSCH according to the received DCI in step 1130, then the terminal decodes the PDSCH.

In step 1140, the terminal transmits the result of receiving the PDSCH to the base station by using the DCI, the parameters indicated or configured in steps 1100 and 1110, PDSCH-to-HARQ_feedback timing obtained by determining the same with various methods described in an embodiment, and PUCCH resources.

Alternatively, in steps 1000 and step 1100, the base station may transmit PDCCH-related configuration information.

The base station may transmit PDCCH-related configuration information to the terminal through an upper-level signal. The upper-level signal is also referred to as upper-level signaling, which may refer to a signal delivery method wherein, as described above, the base station delivers signals to the terminal by using a downlink data channel in the physical layer, or the terminal delivers signals to the base station through an uplink data channel in the physical layer. The upper-level signal may include signals delivered through RRC signaling, PDCP signaling, and MAC control elements, and may include system information (e.g., an SIB and a master information block (MIB)).

The PDCCH-related configuration information may include at least one of information regarding the size of slot format indicator information, information regarding the transmission period of the slot format indicator information, or slot format indicator information regarding at least one slot indicated by the slot format indicator information. The base station may also transmit at least one of information regarding the size of slot format indicator information or information regarding the transmission period of slot format indicator information separately from the PDCCH-related configuration information.

Configuration information regarding PDSCH-to-HARQ_feedback timing may be determined through a dl-DataToUL-ACK value configured through an upper-level signal and through the Tables provided as examples above, and the value indicated by PDSCH-to-HARQ_feedback timing may vary depending on slot format indicator information or channel occupancy time information received from the base station.

Figure 12:
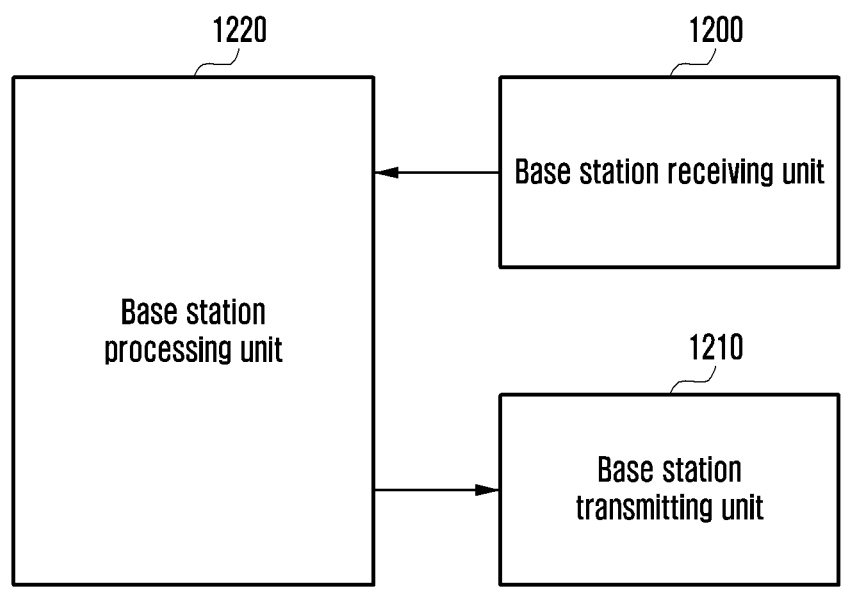
FIG. 12 illustrates a base station according to an embodiment.

FIG. 12 illustrates a base station according to an embodiment.

Referring to FIG. 12, the base station includes a base station receiving unit 1200, a base station transmitting unit 1210, and a base station processing unit 1220. The base station receiving unit 1200 and the base station transmitting unit 1210 may also be implemented as a transmitting/receiving unit (or a transceiver). The base station processing unit 1220 may include at least one processor, and the base station may also be implemented to further include a memory. The base station receiving unit 1200, the base station transmitting unit 1210, and the base station processing unit 1220 may operate according to the above-mentioned base station communication method. However, constituent elements of the base station are not limited to the above example. For example, the base station may include more constituent elements or fewer constituent elements than the above-mentioned constituent elements. The base station receiving unit 1200, the base station transmitting unit 1210, and the base station processing unit 1220 may be implemented as a single chip. In addition, the base station processing unit 1220 may include at least one processor.

The transmitting/receiving unit refers to a combination of the base station receiving unit 1200 and the base station transmitting unit 1210, and may transmit/receive signals with the terminal. Signals transmitted/received with the terminal may include control information and data. The transmitting/receiving unit may include a radio frequency (RF) transmitter configured to up-convert and amplify the frequency of a transmitted signal, and an RF receiver configured to low-noise-amplify a received signal and to down-convert the frequency thereof. However, this is only an embodiment of the transmitting/receiving unit, and the constituent elements of the transmitting/receiving unit are not limited to the RF transmitter and the RF receiver. In addition, the transmitting/receiving unit may receive a signal through a radio channel, may output the same to the base station processing unit 1220, and may transmit a signal output from the base station processing unit 1220 through the radio channel.

The base station processing unit 1220 may control a series of processes such that the base station can operate according to the above-mentioned embodiments. For example, if the transmitting/receiving unit receives a data signal including a control signal transmitted by the terminal, the base station processing unit 1220 may determine the result of receiving the control signal transmitted by the terminal and the data signal. In addition, the base station processing unit 1220 may perform a channel access procedure in connection with an unlicensed band. The transmitting/receiving unit may receive signals transmitted through the unlicensed band, and the base station processing unit 1220 may compare the intensity or the like of the received signals with a threshold value defined in advance or determined based on the value of a function having a bandwidth or the like as a factor thereof, thereby determining whether or not the unlicensed band is in an idle state.

In addition, the base station processing unit 1220 may maintain or change the contention window value for a channel access procedure according to the terminal's result of receiving a data signal from the transmitting/receiving unit. If it is determined that the unlicensed band is in an idle state, a downlink signal including slot format indicator information may be transmitted through the transmitting/receiving unit. The transmitting/receiving unit may add and transmit, to the terminal, information regarding the uplink or downlink transmission interval within the channel occupancy interval of the unlicensed band, determined by the base station processing unit 1220. In addition, the base station may receive the PUSCH transmitted by the terminal through the transmitting/receiving unit in a PUSCH transmission resource domain determined according to slot format indicator information and PDSCH/PUSCH scheduling information.

The base station processing unit 1220 may perform a series of operations for providing the terminal with configuration information regarding PDSCH-to-HARQ_feedback timing, a dl-DataToUL-ACK value configured through an upper-level signal, and information regarding tables as described above. That is, the base station processing unit 1220 may control other constituent elements of the base station so as to perform upper-level signal transmission, SFI transmission, DCI transmission, a channel access procedure, etc.

The base station processing unit 1220 may execute a program for indicating the channel occupancy time stored in the memory, thereby transmitting PDCCH-related configuration information to the terminal, and performing a channel access procedure for occupying the channel of the unlicensed band. The base station processing unit 1220 may control the transmitting/receiving unit and the memory so as to provide slot format indicator information regarding at least one slot through the time for which the channel is occupied through a channel access procedure, based on the PDCCH-related configuration information. The base station processing unit 1220 may control other elements of the base station so as to perform the above-mentioned method for indicating the channel occupancy time.

The memory may store data and programs necessary for operation of the base station. In addition, the memory may store data or control information included in a signal acquired from the base station. The memory may include storage media such as a read only memory (ROM), a random access memory (RAM), a hard disk, a compact disc (CD)-ROM, a digital video disc (DVD), or a combination of such storage media.

Figure 13:
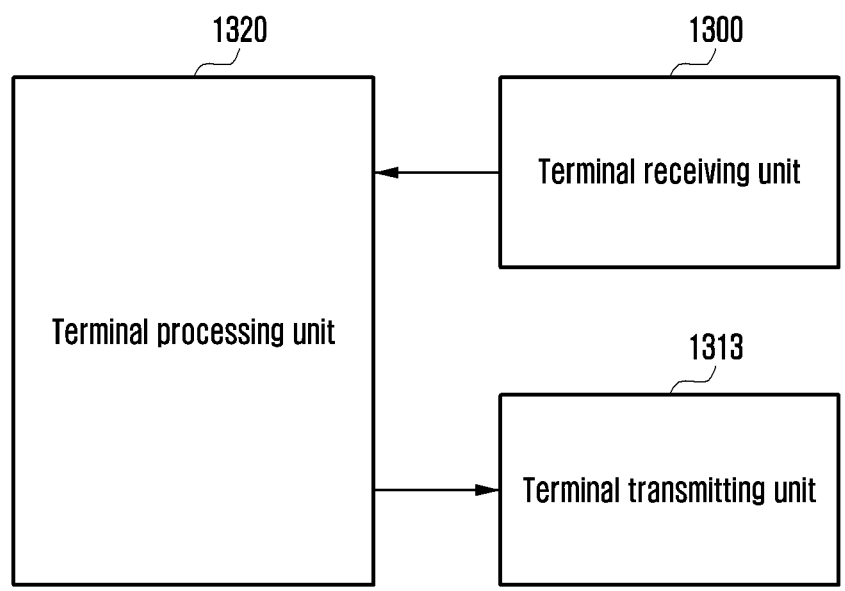
FIG. 13 illustrates a terminal according to an embodiment.

FIG. 13 illustrates a terminal according to an embodiment.

Referring to FIG. 13, the terminal includes a terminal receiving unit 1300, a terminal transmitting unit 1310, and a terminal processing unit 1320. The terminal receiving unit 1300 and the terminal transmitting unit 1310 may also be implemented as a transmitting/receiving unit (or a transceiver). The terminal processing unit 1320 may include at least one processor, and the terminal may also be implemented to further include a memory. The terminal receiving unit 1300, the terminal transmitting unit 1310, and the terminal processing unit 1320 may operate according to the above-described terminal communication methods.

Constituent elements of the terminal are not limited to the above example. For example, the terminal may include more constituent elements or fewer constituent elements than the above-mentioned constituent elements. The terminal receiving unit 1300, the terminal transmitting unit 1310, and the terminal processing unit 1320 may be implemented as a single chip. In addition, the terminal processing unit 1320 may include at least one processor.

The transmitting/receiving unit refers to a combination of the terminal receiving unit 1300 and the terminal transmitting unit 1310, and may transmit/receive signals with the base station. Signals transmitted/received with the base station may include control information and data. The transmitting/receiving unit may include an RF transmitter configured to up-convert and amplify the frequency of a transmitted signal, and an RF receiver configured to low-noise-amplify a received signal and to down-convert the frequency thereof. However, this is only an embodiment of the transmitting/receiving unit, and the constituent elements of the transmitting/receiving unit are not limited to the RF transmitter and the RF receiver.

In addition, the transmitting/receiving unit may receive a signal through a radio channel, may output the same to the terminal processing unit 1320, and may transmit a signal output from the terminal processing unit 1320 through the radio channel.

The terminal processing unit 1320 may control a series of processes such that the terminal can operate according to the above-mentioned embodiments. For example, if the transmitting/receiving unit receives a data signal including a control signal, the terminal processing unit 1320 may determine the result of receiving the data signal. Thereafter, if the first signal receiving result, including data reception, needs to be transmitted to the base station at the timing, the transmitting/receiving unit transmits the first signal receiving result to the base station at timing determined by the terminal processing unit 1320. If the transmitting/receiving unit has received information regarding an uplink or downlink transmission interval within the channel occupancy interval of the unlicensed band from the base station, the terminal processing unit 1320 may reconfigure or change the terminal's downlink control channel transmission time or period. Alternatively, the terminal may reconfigure or change time domain assignment information of the scheduled uplink data channel, and the terminal receiving unit may accordingly receive the downlink control channel transmitted by the base station.

In addition, the terminal may receive the result of receiving uplink data transmitted from the base station, and the terminal processing unit 1320 may maintain or change the size of the contention window used for the channel access procedure for unlicensed band signal transmission according to the received result. The terminal may use the transmitting/receiving unit to receive slot format indicator information transmitted by the base station, and the terminal processing unit 1320 may reconfigure or change time domain assignment information of the uplink data channel scheduled according to the received slot format indicator information.

The terminal processing unit 1320 may perform a series of operations of configuring slot format information, providing slot format information, receiving additional information such as offset information and effective slot information from the base station, and acquiring slot format information based on the received information. The terminal processing unit 1320 may control other constituent elements of the terminal so as to perform upper-level signal reception, SFI reception, DCI reception, and a channel access procedure.

The terminal processing unit 1320 may perform a series of operations for determining PDSCH-to-HARQ_feedback timing through configuration information regarding PDSCH-to-HARQ_feedback timing, a dl-DataToUL-ACK value configured through an upper-level signal from the base station, information regarding tables provided as examples in some embodiments, and additional channel occupancy time information of the base station.

In addition, the terminal processing unit 1320 may execute a program for acquiring the channel occupancy time information stored in the memory, thereby receiving a PDCCH from the base station based on PDCCH-related configuration information, and the terminal processing unit 1320 may control the transmitting/receiving unit and the memory so as to acquire slot format indicator information inside the received PDCCH and to determine at least one of the base station's maximum channel occupancy time and channel occupancy time, based on the slot format indicator information. The terminal processing unit 1320 may control other elements of the terminal so as to perform the above-mentioned method for acquiring the channel occupancy time.

The memory may store data and programs necessary for operation of the terminal. In addition, the memory may store data or control information included in a signal acquired from the terminal. The memory may include storage media such as a ROM, a RAM, a hard disk, a CD-ROM, a DVD, or a combination of such storage media.

Methods according to embodiments described in the claims or specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to embodiments described in the claims or specification of the disclosure.

The programs (software modules or software) may be stored in non-volatile memories including a random access memory and a flash memory, a ROM, an electrically erasable programmable ROM (EEPROM), a magnetic disc storage device, a CD-ROM, a DVD, other types of optical storage devices, or a magnetic cassette. Alternatively, the programs may be stored in a memory including a combination of all or some of the above elements. Further, a plurality of such memories may be included in the electronic device.

The programs may be stored in an attachable storage device which may access the electronic device through communication networks such as the Internet, Intranet, local area network (LAN), wide LAN (WLAN), storage area network (SAN), or a combination thereof. Such a storage device may access a device configured to perform an embodiment through an external port. In addition, a separate storage device on a communication network may access the device configured to perform an embodiment.

In the above-described embodiments, elements included in the disclosure are expressed in singular or plural forms depending on the presented specific embodiments. However, the singular or plural expressions are selected and adapted to situations presented to facilitate the description, and the disclosure is not limited to a singular element or plural elements. Even an element expressed in a plural form may be configured in a singular form, and even an element expressed in a singular form may be configured in a plural form.

The embodiments disclosed in the specification and drawings are merely presented to easily describe technical contents of the disclosure and to help the understanding of the disclosure and are not intended to limit the scope of the disclosure. That is, those skilled in the art to which the disclosure belongs will appreciate that different modifications can be achieved based on the technical idea of the disclosure. Further, if necessary, the above respective embodiments may be employed in combination. For example, parts of embodiments described in the disclosure may be combined to operate the bae station and the terminal. In addition, although above embodiments have been presented with reference to 5G/NR systems, other modifications based on the technical idea of the embodiments may also be implemented in connection with other systems such as LTE, LTE-A, and LTE-A-Pro systems.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a terminal in a wireless communication system, the method comprising:
   receiving, from a base station, first downlink control information (DCI) scheduling a physical downlink shared channel (PDSCH), the first DCI including first hybrid automatic repeat request (HARQ) feedback timing information, wherein a value of the first HARQ feedback timing information is one among a plurality of values configured by a higher layer, and wherein the value indicates to the terminal not to transmit HARQ acknowledgement (ACK) information for the PDSCH in case that an uplink slot associated with the first DCI is outside of a channel occupancy time of the base station;
   receiving, from the base station, the PDSCH based on the first DCI; and
   identifying not to transmit the HARQ-ACK information for the PDSCH based on the value of the first HARQ feedback timing information included in the first DCI,
   wherein a reception of the PDSCH and a transmission of the HARQ-ACK information are related with an unlicensed band.

2. The method of claim 1, further comprising:
   receiving, from the base station, a second DCI including second HARQ feedback timing information having a value for identifying a slot for the HARQ-ACK information, the value of the second HARQ feedback timing information being different from the value of the first HARQ feedback timing information; and
   transmitting, to the base station, the HARQ-ACK information for the PDSCH in the slot identified based on the value of the second HARQ feedback timing information included in the second DCI.

3. A terminal in a wireless communication system, the terminal comprising:
   a transceiver configured to transmit or receive a signal; and
   a controller coupled with the transceiver and configured to:
   receive, from a base station, first downlink control information (DCI) scheduling a physical downlink shared channel (PDSCH), the first DCI including first hybrid automatic repeat request (HARQ) feedback timing information, wherein a value of the first HARQ feedback timing information is one among a plurality of values configured by a higher layer, and wherein the value indicates to the terminal not to transmit HARQ acknowledgement (ACK) information for the PDSCH in case that an uplink slot associated with the first DCI is outside of a channel occupancy time of the base station,
   receive, from the base station, the PDSCH based on the first DCI, and
   identify not to transmit the HARQ-ACK information for the PDSCH based on the value of the first HARQ feedback timing information included in the first DCI,
   wherein a reception of the PDSCH and a transmission of the HARQ-ACK information are related with an unlicensed band.

4. The terminal of claim 3, wherein the controller is further configured to:
   receive, from the base station, a second DCI including second HARQ feedback timing information having a value for identifying a slot for the HARQ-ACK information, the value of the second HARQ feedback timing information being different from the value of the first HARQ feedback timing information, and
   transmit, to the base station, the HARQ-ACK information for the PDSCH in the slot identified based on the value of the second HARQ feedback timing information included in the second DCI.

5. A method performed by a base station in a wireless communication system, the method comprising:
   transmitting, to a terminal, first downlink control information (DCI) scheduling a physical downlink shared channel (PDSCH), the first DCI including first hybrid automatic repeat request (HARQ) feedback timing information, wherein a value of the first HARQ feedback timing information is one among a plurality of values configured by a higher layer, and wherein the value indicates to the terminal not to transmit HARQ acknowledgement (ACK) information for the PDSCH in case that an uplink slot associated with the first DCI is outside of a channel occupancy time of the base station;
   transmitting, to the terminal, the PDSCH based on the first DCI; and
   identifying not to receive the HARQ-ACK information for the PDSCH based on the value of the first HARQ feedback timing information included in the first DCI,
   wherein a transmission of the PDSCH and a reception of the HARQ-ACK information are related with an unlicensed band.

6. The method of claim 5, further comprising:
   transmitting, to the terminal, a second DCI including second HARQ feedback timing information having a value for identifying a slot for the HARQ-ACK information, the value of the second HARQ feedback timing information being different from the value of the first HARQ feedback timing information; and
   receiving, from the terminal, the HARQ-ACK information for the PDSCH in the slot identified based on the value of the second HARQ feedback timing information included in the second DCI.

7. A base station in a wireless communication system, the base station comprising:
   a transceiver configured to transmit or receive a signal; and a controller coupled with the transceiver and configured to:

transmit, to a terminal, first downlink control information (DCI) scheduling a physical downlink shared channel (PDSCH), the first DCI including first hybrid automatic repeat request (HARQ) feedback timing information, wherein a value of the first HARQ feedback timing information is one among a plurality of values configured by a higher layer, and wherein the value indicates to the terminal not to transmit HARQ acknowledgement (ACK) information for the PDSCH in case that an uplink slot associated with the first DCI is outside of a channel occupancy time of the base station, transmit, to the terminal, the PDSCH based on the first DCI, and identify not to receive the HARQ-ACK information for the PDSCH based on the value of the first HARQ feedback timing information included in the first DCI, wherein a transmission of the PDSCH and a reception of the HARQ-ACK information are related with an unlicensed band.

8. The base station of claim 7, wherein the controller is further configured to:

transmit, to the terminal, a second DCI including second HARQ feedback timing information having a value for identifying a slot for the HARQ-ACK information, the value of the second HARQ feedback timing information being different from the value of the first HARQ feedback timing information, and receive, from the terminal, the HARQ-ACK information for the PDSCH in the slot identified based on the value of the second HARQ feedback timing information included in the second DCI.

9. The method of claim 1,
wherein the HARQ-ACK information for the PDSCH is not transmitted in the uplink slot associated with the first DCI.

10. The terminal of claim 3,
wherein the HARQ-ACK information for the PDSCH is not transmitted in the uplink slot associated with the first DCI.

11. The method of claim 5,
wherein the HARQ-ACK information for the PDSCH is not received in the uplink slot associated with the first DCI.

12. The base station of claim 7,
wherein the HARQ-ACK information for the PDSCH is not received in the uplink slot associated with the first DCI.

* * * * *